(12) United States Patent
Jeyaseelan Arockiaraj et al.

(10) Patent No.: US 12,400,212 B2
(45) Date of Patent: Aug. 26, 2025

(54) GENERATING BUNDLED SETS FROM PREDETERMINED CARD PARAMETER CONFIGURATIONS UTILIZING MACHINE-LEARNING

(71) Applicant: Marqeta, Inc., Oakland, CA (US)

(72) Inventors: Santiago Vinoth Jeyaseelan Arockiaraj, San Ramon, CA (US); Bhavana Yarasuri, Chicago, IL (US)

(73) Assignee: Marqeta, Inc., Oakland, CA (US)

( * ) Notice: Subject to any disclaimer, the term of this patent is extended or adjusted under 35 U.S.C. 154(b) by 157 days.

(21) Appl. No.: 17/663,912

(22) Filed: May 18, 2022

(65) Prior Publication Data
US 2023/0376935 A1   Nov. 23, 2023

(51) Int. Cl.
*G06Q 30/00*   (2023.01)
*G06Q 20/34*   (2012.01)

(52) U.S. Cl.
CPC .................... *G06Q 20/34* (2013.01)

(58) Field of Classification Search
CPC ...................................................... G06Q 30/34
USPC ............... 705/39, 1.1, 35, 44, 14.58, 30, 38; 707/615; 235/379
See application file for complete search history.

(56) References Cited

U.S. PATENT DOCUMENTS

| | | | | |
|---|---|---|---|---|
| 10,223,708 B2* | 3/2019 | Pirillo | ................ | G06Q 30/0239 |
| 10,796,303 B2* | 10/2020 | Dutta | .................... | G06Q 20/405 |
| 11,636,500 B1* | 4/2023 | Jain | .................... | G06Q 30/0203 |
| | | | | 705/7.32 |

OTHER PUBLICATIONS

ProQuestDialog NPL Search History.*

* cited by examiner

*Primary Examiner* — John H. Holly
(74) *Attorney, Agent, or Firm* — Keller Preece PLLC

(57) ABSTRACT

This disclosure describes methods, non-transitory computer readable storage media, and systems that utilize machine-learning to automatically generate card management programs with varying configurations of card parameters. For example, the disclosed system determines predetermined card parameter configurations from different card parameter categories for generating a card management program. In particular, the disclosed system utilizes a machine-learning model to generate card usage scores for various combinations of the predetermined card parameter configurations. The disclosed system utilizes the card usage scores generated by the machine-learning model to generate a bundled set of parameter configurations including a combination of a subset of the predetermined card parameter configurations. The disclosed system also provides the bundled set of parameter configurations as a recommendation for generating the card management program.

20 Claims, 10 Drawing Sheets

900

```
┌─────────────────────────────────────────────────────────────────┐
│ Determining Predetermined Card Parameter Configurations For Generating │
│                A Card Management Program 902                    │
└─────────────────────────────────────────────────────────────────┘
                                │
                                ▼
┌─────────────────────────────────────────────────────────────────┐
│ Generating Card Usage Scores For Combinations Of Predetermined Card │
│  Parameter Configurations Utilizing A Machine-learning Model 904 │
└─────────────────────────────────────────────────────────────────┘
                                │
                                ▼
┌─────────────────────────────────────────────────────────────────┐
│ Generating A Bundled Set Of Parameter Configurations Based On The Card │
│                     Usage Scores 906                            │
└─────────────────────────────────────────────────────────────────┘
                                │
                                ▼
┌─────────────────────────────────────────────────────────────────┐
│ Providing The Bundled Set Of Parameter Configurations For Display At A │
│                     Client Device 908                           │
└─────────────────────────────────────────────────────────────────┘
```

*Fig. 9*

GENERATING BUNDLED SETS FROM PREDETERMINED CARD PARAMETER CONFIGURATIONS UTILIZING MACHINE-LEARNING

BACKGROUND

Increases in computing technology and availability have led to an increase in use of card-based payment transactions and electronic payment transactions to complete purchase transactions. In connection with the prevalence of card/electronic payment transactions, many entities (e.g., banks or other issuers) have provided increased access to payment cards (e.g., credit cards) for consumers to use with many different merchants and recipient entities. In particular, such entities manage a number of different payment cards for many different users to use in engaging in payment transactions via mobile devices, online interfaces of personal devices, and physical point-of-sale devices.

While many entities provide access to payment cards with varying attributes that affect how users can use the payment cards or benefits associated with the payment cards, conventional systems that create and offer payment cards to consumers often lack flexibility and efficiency. Specifically, developing and launching a card can involve communications between several different systems and devices, which introduces significant time delays in the development process. Furthermore, creating a card program typically requires connecting systems and devices of different entities via an integration process that adds additional time delays and complexity. More specifically, enabling communications between many different systems and devices that each have different capabilities and infrastructures can be a difficult and technologically complex problem when generating card management programs. The process also typically involves the generation and inclusion of documentation and protocols for a number of different aspects of a card program to comply with various technical and industry standards, which results in additional processing delays and complexity when involving a number of different systems/devices.

To reduce the impact of these processing and integration delays in developing and deploying a card, conventional systems often create card programs with specific, rigid configurations of parameters. In particular, because conventional systems and methods lack the ability to limit the inefficiencies in the card development and deployment process, the conventional systems merely restrict the number of new card programs deployed. Additionally, by restricting generation and modification of card programs to a rigid set of configurations, the conventional systems limit the usability and reach of the card programs. Accordingly, the conventional systems lack flexibility for generating and implementing various parameters of card programs for different use cases and user segments.

SUMMARY

This disclosure describes one or more embodiments of methods, non-transitory computer readable media, and systems that solves one or more of the foregoing problems (in addition to providing other benefits). Specifically, in one or more embodiments, the disclosed systems utilize machine-learning to automatically generate card management programs with varying configurations of card parameters. For example, the disclosed systems determine predetermined card parameter configurations from different card parameter categories for generating a card management program. In particular, the disclosed systems utilize a machine-learning model to generate card usage scores for various combinations of the predetermined card parameter configurations. The disclosed systems utilize the card usage scores generated by the machine-learning model to generate a bundled set of parameter configurations including a combination of a subset of the predetermined card parameter configurations. The disclosed systems also provide the bundled set of parameter configurations as a recommendation for generating the card management program. By utilizing a machine-learning model to automatically generate bundled sets of card parameter configurations, the disclosed systems provide flexible and efficient card management program generation.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description refers to the drawings briefly described below.

FIG. 9 illustrates a flowchart of a series of acts for utilizing machine-learning to generate a card management program from a plurality of predetermined card parameter configurations in accordance with one or more implementations.

DETAILED DESCRIPTION

Figure 1:
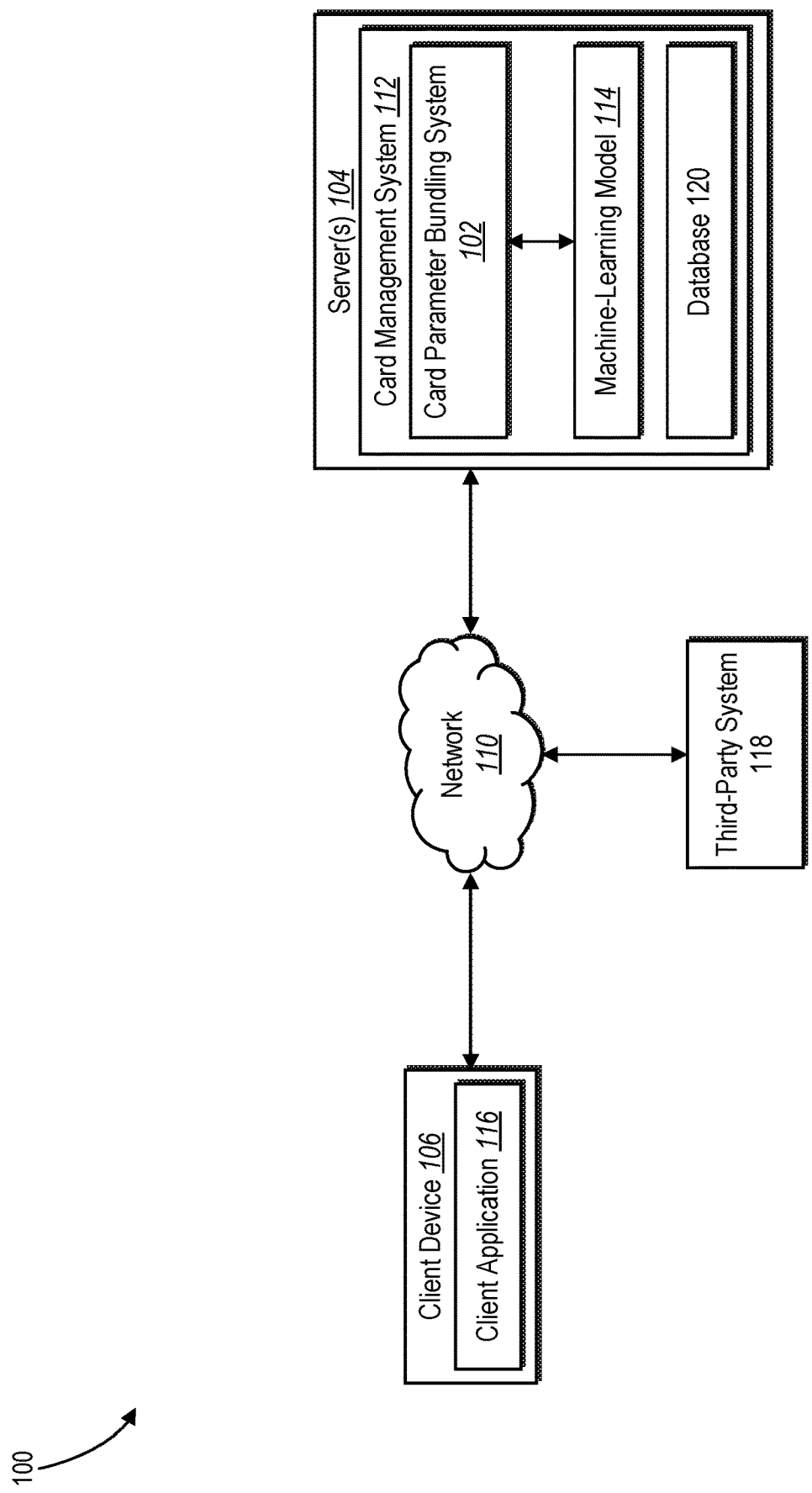
FIG. 1 illustrates a block diagram of a system environment in which a card parameter bundling system is implemented in accordance with one or more implementations.

This disclosure describes one or more embodiments of a card parameter bundling system that utilizes machine-learning to generate card management programs for developing and deploying cards to a plurality of users. In particular, the card parameter bundling system determines predetermined card parameter configurations from a plurality of different card parameter categories. The card parameter bundling system utilizes a machine-learning model to generate card usage scores for various configurations of the card management program based on the predetermined card parameter configurations. Additionally, the card parameter bundling system selects a combination of card parameter configurations based on the card usage scores and generates a bundled set from the selected card parameter configurations. The card parameter bundling system provides the bundled set of parameter configurations for display at a client device as a recommendation for generating the card management program. Thus, the card parameter bundling system automatically generates recommendations of card parameter configurations by utilizing machine-learning to determine combinations of parameter configurations that result in optimal card usage scores.

As mentioned, in one or more embodiments, the card parameter bundling system determines predetermined card parameter configurations corresponding to different card parameter categories. For example, the card parameter bundling system determines a plurality of different possible categories of parameters that can be associated with cards in a card management program. To illustrate, the card parameter bundling system determines parameters from categories including global configurations, usage configurations, pricing/rate strategies, rewards strategies, disclosure templates, or other parameter configurations that determine how a card for a given card management program can be used. Furthermore, the card parameter bundling system determines predetermined parameter configurations that were previously generated for one or more card parameter categories for use in one or more card management systems.

In one or more additional embodiments, the card parameter bundling system utilizes a machine-learning model to generate card usage scores for different configurations of a card management program. Specifically, the card parameter bundling system utilizes the machine-learning model to generate a card usage score (e.g., a card acquisition score and/or a card retention score) for a combination of predetermined card parameter configurations from the different card parameter categories. For instance, the machine-learning model includes weights trained utilizing a historical card dataset including card usage data for card management programs. The card parameter bundling system can thus generate card usage scores for a plurality of different combinations of predetermined card parameter configurations.

In one or more embodiments, the card parameter bundling system generates a bundled set of parameter configurations based on the card usage scores generated by the machine-learning model. To illustrate, the card parameter bundling system compares card usage scores of various combinations of parameter configurations to select a combination. For example, the card parameter bundling system determines the best or otherwise high performing combination having the highest card usage score and generates a bundled set of parameter configurations mapping the combination of parameters.

According to some embodiments, the card parameter bundling system provides the bundled set of parameter configurations for display at a client device. In particular, the card parameter bundling system generates a recommendation of the selected bundled set of parameter configurations (e.g., based on the corresponding card usage score) including corresponding card parameter configurations from the various card parameter categories. The card parameter bundling system provides the recommendation for display at a client device for generating the card management program.

In one or more embodiments, the card parameter bundling system provides tools for modifying existing card management programs. For instance, the card parameter bundling system provides graphical user interface elements for selecting predetermined card parameter configurations from different card parameter categories. Additionally, the card parameter bundling system provides tools for replacing one or more configurations in a card management program with one or more additional configurations. The card parameter bundling system copies and clones the existing card management program and modifies the cloned card management program for generating an additional card management program.

The disclosed card parameter bundling system provides a number of benefits over conventional systems. For example, the card parameter bundling system improves the efficiency of computing systems that develop and deploy card management programs. In contrast to existing systems that suffer from delays and complexity involved in card development and deployment due to communications between systems and devices, the card parameter bundling system utilizes machine-learning to automatically bundle parameter configurations for deployment. Specifically, the card parameter bundling system utilizes a machine-learning model to select from combinations of previously created card parameter configurations for bundling with a card management system. By automatically generating bundled sets of parameter configurations utilizing machine-learning, the card parameter bundling system efficiently determines configurations for card management systems for targeting to particular segments. Additionally, utilizing the bundled sets of predetermined card configuration parameters to generate card management systems allows the card parameter bundling system to efficiently generate different combinations of parameter configurations without requiring additional communications with or between devices associated with different card parameter categories.

In addition, the disclosed card parameter bundling system improves the flexibility of computing systems via the use of machine-learning and predetermined card parameter configurations. Specifically, while existing systems limit card program creation to a rigid and severely limited process, the card parameter bundling system provides a card management program generation process with easily configurable parameters and intelligent learning process. To illustrate, the card parameter bundling system utilizes historical data associated with card management programs to train the machine-learning model to automatically identify combinations of card parameter configurations for a variety of different segments of users, including customizing at an individual user account level. Additionally, by leveraging predetermined card parameter configurations for different card parameter categories, the card parameter bundling system can provide tools for testing new configurations of parameters without modifying existing card management programs. Thus, the card parameter bundling system can provide an efficient and flexible process for generating different card management programs.

The card parameter bundling system also provides improved flexibility in the granularity of performance tracking of different card parameter configurations of card management programs. For instance, in contrast to conventional systems that merely determine the success or performance of card management programs as a whole, the card parameter bundling system can determine the performance of individual card parameter configurations in bundled sets of parameter configurations. Additionally, the card parameter bundling system can utilize machine-learning to determine the performance of individual card parameter configurations in connection with varying sizes of segments (e.g., many users or individual users). Accordingly, the card parameter bundling system provides increased flexibility in generating bundled sets of parameter configurations to varying sizes of target segments based on the improved granularity of performance tracking.

Furthermore, the disclosed card parameter bundling system provides improved efficiency in computing devices and graphical user interfaces for card management systems over conventional systems. In particular, in contrast to conventional systems that are limited to a rigid card program generation process due to system/device infrastructures, the card parameter bundling system provides a graphical user interface that integrates different parameter configurations from different systems. For instance, the card parameter bundling system provides graphical user interface elements corresponding to different parameter configurations corresponding to different systems for efficiently combining the parameter configurations. Additionally, the card parameter bundling system provides combinations of card parameter configurations without requiring different systems to upgrade or change existing architectures when generating a new card management program.

Turning now to the figures, FIG. 1 includes an embodiment of a system environment 100 in which a card parameter bundling system 102 operates. In particular, the system environment 100 includes server(s) 104, a client device 106, and a third party system 108 in communication via a network 110. Moreover, as shown, the card parameter bundling system 102 is part of a card management system 112 and includes a machine-learning model 114. FIG. 1 also illustrates that the client device 106 includes a client application 116.

As shown in FIG. 1, the server(s) 104 include or host the card management system 112. The server(s) 104 communicate with one or more other components in the system environment 100 to manage cards for one or more. For example, the server(s) 104 communicate with the client device 106 to provide card management for users based on data provided/generated by the client device 106. As used herein, the term "card" refers to a physical or digital object corresponding to a payment account for engaging in card-based payment transactions. For example, a card includes a physical credit card or a digital credit card (e.g., in a digital wallet) tied to a payment account via a credit card number that allows a user to initiate a payment transaction to transfer funds from the payment account to a recipient account (e.g., a merchant account).

As used herein, the term "payment transaction" refers to a card-based payment transaction in which a payment card account funds a payment from a user to a recipient. For instance, a payment transaction includes a payment transaction via a point-of-sale device or an electronic payment transaction via a mobile application or online application between a payment card account of a user and a recipient account associated with a recipient (e.g., another user or a merchant system) in a peer-to-peer transaction or a peer-to-business transaction.

According to one or more embodiments, the card management system 112 manages cards for an entity by providing tools to the entity (e.g., to one or more devices) to create card management programs for issuing cards to one or more users. In one or more embodiments, the card management system 112 communicates with the client device 106 to provide tools for developing and deploying a card management program (e.g., via the client application 116). As used herein, the term "card management program" or "card program" refers to software and data that determines when and how one or more cards or card accounts can be used to engage in payment transactions. For example, a card management program includes a plurality of card parameter configurations that define attributes of a card associated with the card management program including, but not limited to, pricing (e.g., annual percentage rate), fees, usage locations, rewards, discounts, or other attributes. Accordingly, different card management programs that have different card parameter configurations provide different usage, benefits, etc., to users of cards corresponding to the different card management programs.

According to one or more embodiments, the card management system 112 communicates with one or more entities involved in creating or managing a card management program with the card management system 112. For example, the entities can include a sub-entity of the card management system 112, an issuer, or other entity that determines when and/or how to use cards in payment transactions. For instance, such an entity includes one or more servers or computing devices that generates card parameter configurations for one or more card parameter categories. To illustrate, a given system can provide card parameter configurations related to one or more specific card parameter categories (e.g., a fee category and/or an annual percentage rate category). In additional embodiments, an entity includes an external (e.g., third-party) system that communicates with an issuer system to generate and/or manage card accounts. In some instances, a plurality of entities cooperate to generate or modify a single card parameter configuration. Thus, the card management system 112 can communicate with any number of entities (e.g., via the systems/devices) to determine any number of card parameter configurations for a card management program.

In one or more embodiments, the entities involved in managing card management programs include, but are not limited to, a marketing sub-entity, a legal/compliance sub-entity, a risk management sub-entity, and a revenue sub-entity of a card issuer. Specifically, each sub-entity can perform various operations associated with card management such as achieving goals related to global (e.g., overall) strategy, pricing, rewards and offers, credit risk management, fraud management, and compliance with industry standards, regulations, and laws. Furthermore, the sub-entities can determine various parameters of a card management program including, but not limited to, value propositions, segmentation, market positioning, costs (e.g., annual percentage rates, fees), underwriting, acquisition and retention, credit limit management, upgrading/downgrading of accounts, charge offs, disputes and chargebacks, prime rates, and disclosure management.

In one or more embodiments, the card management system 112 hosts, or otherwise communicates with, the card parameter bundling system 102 to generate and manage card management programs. For example, the card parameter bundling system 102 generates bundled sets of parameter configurations based on available card parameter configurations provided in connection with one or more card management programs. In particular, a bundled set of parameter configurations can encompass parameters that define specific account attributes within a boundary of a card usage.

Additionally, as illustrated in FIG. 1, the card management system 112 also includes a machine-learning model 114 for selecting a given combination of card parameter configurations for generating a card management program in connection with the card parameter bundling system 102. The card parameter bundling system 102 can provide tools (e.g., via the client application 116 of the client device 106) for generating or modifying a card management program, including selecting specific card parameter configurations for including with a card management program. In some embodiments, the client device 106 is associated with one or more of entities associated with managing a card management program (e.g., the client device 106 includes an administrator device associated with an issuer).

In one or more embodiments, the card management system 112 utilizes the machine-learning model 114 to generate recommended card parameter configurations based on a variety of data sources. To illustrate, the card management system 112 can train the machine-learning model 114 based on data received from the client device 106, data originating from end-user devices (e.g., devices of card holders or merchant devices), and/or third party sources (e.g., the third-party system 118). For instance, the card management system 112 utilizes card parameter configurations, previous bundled sets of card parameter configurations, transaction data, and data associated with end users to train the machine-learning model 114. The card management system 112 can store the data from the various sources in a database 120, which the card management system 112 can later access to train the machine-learning model 114. Specifically, the database 120 can include card parameter configurations, bundled sets of parameter configurations (e.g., previously implemented via card management programs), third-party data, transaction data, card management program data, and end-user data.

In some embodiments, the card management system 112 communicates with the third-party system 118 to obtain information associated with end users. The third-party system 118 can include a credit bureau system, a lender/issuer system, or another system that provides end user data to the card management system 112. The third-party system 118 can provide information associated with one or more users in connection with generating a card management program in response to a request associated with generating the card management program.

In one or more embodiments, in connection with managing virtual cards for payment card accounts, the card management system 112 and/or the card parameter bundling system 102 provides one or more additional systems or devices with card management tools. For example, the one or more additional systems or devices include the client device 106 and/or the card third party system 108. In one or more embodiments, the card management system 112 provides one or more application programming interfaces ("APIs") for the systems or devices to submit a request to generate a card management program. Additionally, the API(s) can provide the client device 106 (or other device associated with a managing entity) with tools to submit predetermined card parameter configurations for generating card management programs. To illustrate, the client device 106 can communicate with the card management system 112 and/or the card parameter bundling system 102 to provide recommendations of bundled sets of card parameter configurations, generate card management programs, and manage/track card usage associated with card management programs.

In one or more embodiments, the server(s) 104 include a variety of computing devices, including those described below with reference to FIG. 10. For example, the server(s) 104 includes one or more servers for storing and processing data associated with card management programs and payment transactions. In some embodiments, the server(s) 104 also include a plurality of computing devices in communication with each other, such as in a distributed storage environment. In some embodiments, the server(s) 104 communicate with a plurality of issuing systems and issuing system devices or other systems and devices of one or more entities based on established relationships between the card management system 112, the card parameter bundling system 102 and the entities. To illustrate, the server(s) 104 communicate with various entities or systems including financial institutions (e.g., issuing banks associated with payment cards), payment card networks associated with processing payment transactions involving payment cards, payment gateways, merchant systems, client devices, or other systems.

In addition, in one or more embodiments, the card management system 112 and/or the card parameter bundling system 102 are implemented on one or more servers. For example, while FIG. 1 illustrates a single server (i.e., server(s) 104), the card management system 112 and/or the card parameter bundling system 102 can be partially or fully implemented on a plurality of servers. To illustrate, the card management system 112 and the card parameter bundling system 102 can be implemented in a distributed environment. In one or more embodiments, each server handles requests for generating card management programs (e.g., by utilizing the machine-learning model 114 to generate recommendations of bundled sets of parameter configurations). In additional embodiments, although FIG. 1 illustrates that the card management system 112 includes the machine-learning model 114 on the server(s) 104, the machine-learning model 114 may be part of one or more other servers or systems. Additionally, although FIG. 1 illustrates that the card management system 112 includes a single machine-learning model, the card parameter bundling system 102 may include a plurality of machine-learning models trained for a plurality of different purposes (e.g., separate machine-learning models for different segments of users or different types of outputs).

Additionally, as shown in FIG. 1, the system environment 100 includes the network 110. The network 110 enables communication between components of the system environment 100. In one or more embodiments, the network 110 may include the Internet or World Wide Web. Additionally, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server(s) 104, the card management system 112, the card parameter bundling system 102, the client device 106, and the third-party system 108 communicate via the network 110 using one or more communication platforms and technologies suitable for transporting data and/or communication signals, including any known communication technologies, devices, media, and protocols supportive of data communications, examples of which are described with reference to FIG. 10. Additionally, in one or more embodiments, one or more of the various components of the system environment 100 communicate using protocols for financial information communications such as PCI standards or other protocols.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 10. Furthermore, although not shown in FIG. 1, the client device 106 can be operated by a user (e.g., a user included in, or associated with, the system environment 100) to perform a variety of functions. In particular, the client device 106 performs functions such as, but not limited to, generating, accessing, viewing, and interacting with a card management program. In some embodiments, the client device 106 also performs functions for modifying card management programs, selecting user segments, and requesting recommendations for card management programs via the card parameter bundling system 102. For example, the client device 106 communicates with the server(s) 104 via the network 110 to provide information (e.g., card usage data, user data) associated with a card management program. Although FIG. 1 illustrates the system environment 100 with a single client device, in some embodiments, the system environment 100 includes a different number of client devices.

Figure 2:
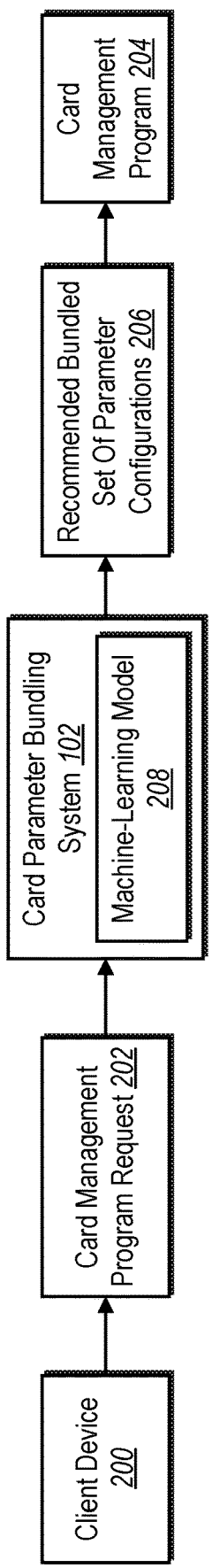
FIG. 2 illustrates a diagram of an overview of a process for utilizing machine-learning to generate a card management program in accordance with one or more implementations.

As mentioned, the card parameter bundling system 102 generates card management programs for providing and administering cards to various users or user segments. For example, FIG. 2 illustrates that the card parameter bundling system 102 generates a card management program for applying various parameter configurations to cards for providing to one or more users. More specifically, FIG. 2 illustrates that the card parameter bundling system utilizes machine-learning to provide recommendations of combinations of parameter configurations for applying to a card management program.

In one or more embodiments, as illustrated in FIG. 2, a client device 200 sends a card management program request 202 to the card parameter bundling system 102 to generate a card management program 204. For instance, the client device 200 is associated with a system that provides cards to users based on the card management program 204. Additionally, the card management program can include parameter configurations that determine usage of cards corresponding to the program. To illustrate, the client device 200 is associated with the card parameter bundling system 102 (e.g., via the card management system 112 of FIG. 1). In alternative embodiments, the client device 200 is associated with an entity that provides one or more parameter configurations for generating the card management program 204.

FIG. 2 illustrates, that the card parameter bundling system 102 generates a recommended bundled set of parameters for generating the card management program 204. In one or more embodiments, the card parameter bundling system 102 includes a machine-learning model 208 to generate the recommended bundled set of parameter configurations 206. For example, the machine-learning model 208 generates the recommended bundled set of parameter configurations 206 for generating the card management program 204 to provide to a particular segment. As described in more detail with respect to FIG. 3, the card parameter bundling system 102 utilizes a machine-learning model to generate recommended bundled set of parameters from a plurality of predetermined card parameter configurations. Furthermore, as described in more detail with respect to FIG. 4 below, the card parameter bundling system 102 trains a machine-learning model to generate card usage scores for different combinations of parameter configurations.

Figure 3:
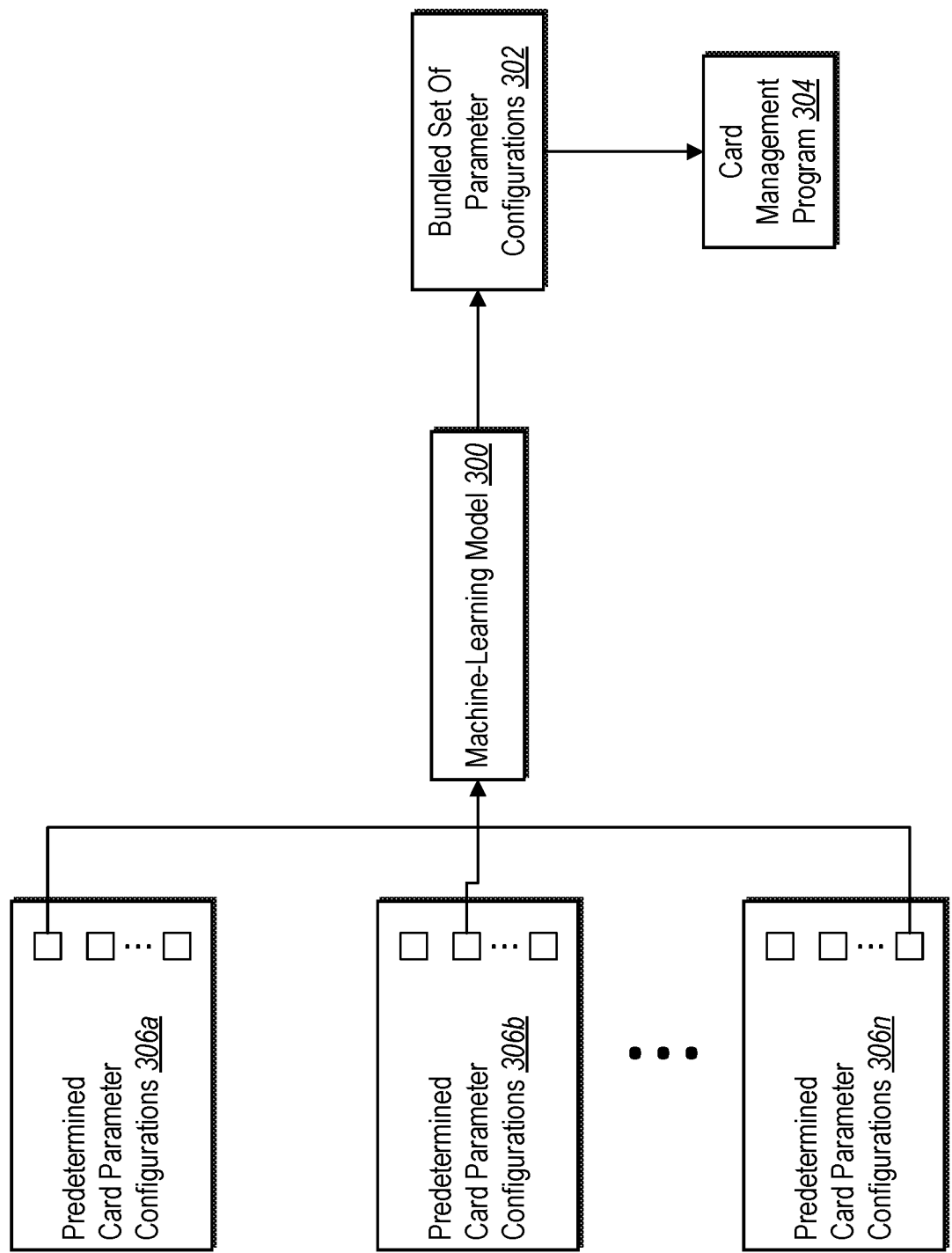
FIG. 3 illustrates a diagram of the card parameter bundling system utilizing machine-learning to generate a bundled set of parameter configurations based on predetermined card parameter configurations in accordance with one or more implementations.

As mentioned, FIG. 3 illustrates a diagram of the card parameter bundling system 102 utilizing a machine-learning model 300 to generate a recommendation of a bundled set of parameter configurations 302 for generating a card management program 304. In particular, the card parameter bundling system 102 determines a plurality of predetermined card parameter configurations 306a-306n corresponding to a plurality of different card parameter categories. Furthermore, in one or more embodiments, the card parameter bundling system 102 determines the predetermined card parameter configurations 306a-306n from one or more entities (e.g., from one or more devices of entities associated with an issuer system).

As shown in FIG. 3, the card parameter bundling system 102 determines the plurality of predetermined card parameter configurations 306a-306n for determining the bundled set of parameter configurations 302. As used herein, the term "predetermined card parameter configuration" (or "card parameter configuration") refers to one or more parameters that indicate one or more limitations, benefits, or other possible usage characteristics that correspond to a card. For instance, a first entity can generate first predetermined card parameter configurations 306a corresponding to a first card parameter category. To illustrate, the first entity generates a plurality of predetermined card parameter configurations including policies that a card management program can include for applying to one or more cards for one or more users. According to one or more embodiments, the first predetermined card parameter configurations 306a correspond to a particular product or offering, a pricing strategy, an offer, fees, rewards, or other attributes that determine how a user may use a corresponding card or the benefits/limitations that apply to the card.

In one or more embodiments, the entities generate the predetermined card parameter configurations 306a-306n prior to providing the predetermined card parameter configurations 306a-306n to the card parameter bundling system 102. Specifically, the entities can generate a first card parameter configuration, a second card parameter configuration, etc., of the predetermined card parameter configurations 306a-306n. To illustrate, the first entity can generate a target segment parameter configuration, a second entity can generate an annual percentage rate parameter configuration, and an nth entity can generate a dispute/chargeback parameter configuration, etc.

Although the above description describes a separate entity for each group of predetermined card parameter configurations, a single entity can generate predetermined card parameter configurations for a plurality of different card parameter categories. Alternatively, more than one entity can collaborate to generate predetermined card parameter configurations. For instance, a first entity and a second entity can communicate to generate a first predetermined card parameter configuration corresponding to a first card parameter category. Thus, any number of entities can generate predetermined card parameter configurations for a plurality of card parameter categories.

According to some embodiments, an entity provides a predetermined card parameter configuration to the card parameter bundling system 102 via an API call to the card parameter bundling system 102. For instance, the card parameter bundling system 102 can generate an API for integrating with a plurality of different sub-entities of issuer systems. The sub-entities can make separate API calls to the card parameter bundling system 102 to provide predetermined card parameter configurations for different card parameter categories. In other embodiments, the entities push the N predetermined card parameter configurations to a database including predetermined card parameter configurations for a plurality of card parameter categories. The card parameter bundling system 102 can access the predetermined card parameter configurations from the database.

According to one or more embodiments, the card parameter bundling system 102 selects combinations of a plurality of predetermined card parameter configurations from the different card parameter categories. For instance, the card parameter bundling system 102 determines combinations of predetermined card parameter configurations from the card parameter categories. The card parameter bundling system 102 also utilizes the machine-learning model 300 to generate card usage scores for the combinations of predetermined card parameter configurations.

As used herein, the term "machine-learning model" refers to a computer representation that is tuned (e.g., trained) based on inputs to approximate unknown functions. For instance, a machine-learning model includes one or more layers or artificial neurons that approximate unknown functions by analyzing known data at different levels of abstraction. In some embodiments, a machine-learning model includes one or more neural network layers including, but not limited to, a deep learning model, a convolutional neural network, a transformer neural network, a recurrent neural network, a fully-connected neural network, a classification neural network, or a combination of a plurality of neural networks and/or neural network types. A machine-learning model can also include, but is not limited to, a regression model, a random forest model, a decision tree model, or a combination of a plurality of such models. In one or more embodiments, the machine-learning model 300 includes, but is not limited to, a plurality of neural network layers to encode features of data associated with user accounts or card management programs to predict the impact of various card parameter configurations on one or more performance metrics of the card management programs.

In one or more embodiments, the card parameter bundling system 102 utilizes the machine-learning model 300 to generate a first card usage score for a first combination of predetermined card parameter configurations from the card parameter categories. For example, the first combination can include a first predetermined card parameter configuration from a first card parameter category, a first predetermined card parameter configuration from a second card parameter category, etc. Additionally, the card parameter bundling system 102 utilizes the machine-learning model 300 to generate a second card usage score for a second combination of predetermined card parameter configurations from the card parameter categories. For instance, the second combination can include a second predetermined card parameter configuration from the first card parameter category, the first predetermined card parameter configuration from the second card parameter category, etc. Accordingly, the card parameter bundling system 102 utilizes the machine-learning model 300 to generate a card usage score for each of a plurality of different combinations of predetermined card parameter configurations.

According to one or more embodiments, a card usage score includes a score generated by the machine-learning model 300 that indicates a probability associated with a performance of one or more cards. To illustrate, a card usage score indicates an estimated card acquisition rate (e.g., a rate at which users presented with an option to obtain a card sign up for the card) associated with a card based on the corresponding combination of card parameter configurations. In another example, a card usage score indicates an estimated card retention rate (e.g., a rate at which users maintain accounts for a card for a specific amount of time) associated with a card based on the corresponding combination of card parameter configurations. In additional embodiments, a card usage score indicates a combination of an estimated card acquisition rate and an estimated card retention rate associated with a card based on the corresponding combination of card parameter configurations. The card usage score can also indicate other performance metrics such as upgrade or downgrade rates.

In some embodiments, the card parameter bundling system 102 utilizes the machine-learning model 300 to process account data (or other data associated with cards, users, or the card management program) to generate the card usage scores for a selected segment. For instance, the card parameter bundling system 102 utilizes the machine-learning model 300 to generate the card usage scores based on data including, but not limited to, a portfolio performance, a risk appetite attribute, an experimentation appetite attribute, or a profitability associated with the card. By utilizing such data in combination with combinations of card parameter configurations for a given segment, the card parameter bundling system 102 can automatically generate predictive performance of a card management program utilizing the machine-learning model 300.

In some embodiments, the card parameter bundling system 102 utilizes the machine-learning model 300 to generate card usage scores for a plurality of different combinations of card parameter configurations. The card parameter bundling system 102 utilizes the card usage scores to determine the bundled set of parameter configurations 302 to provide as a recommendation for generating the card management program 304. For example, the card parameter bundling system 102 generates the bundled set of parameter configurations 302 by comparing the card usage scores of the combinations of card parameter configurations and selecting the combination with the highest score.

In alternative embodiments, the card parameter bundling system 102 selects a plurality of combinations to provide as recommendations for the card management program 304. In particular, the card parameter bundling system 102 can provide recommendations of a plurality of different combinations for use in testing the combinations with a plurality of segments prior to mapping a combination to the card management program. For instance, the card parameter bundling system 102 determines a plurality of combinations with card usage scores that meet a predetermined score value (e.g., a minimum card acquisition rate or a minimum card retention rate). Alternatively, the card parameter bundling system 102 determines a predetermined number of combinations with highest card usage scores (e.g., the top two or top five card usage scores). The card parameter bundling system 102 can thus provide recommendations of one or more bundled sets of parameter configurations for generating the card management program 304.

In one or more embodiments, the card parameter bundling system 102 selects the bundled set of parameter configurations according to a goal or desired outcome associated with the card management program 304. As an example, the card parameter bundling system 102 generates the bundled set of parameter configurations 302 according to a "rewards card" card management program, a "secured card" card management program, or a "low rate offer card" card management program. Accordingly, the card parameter bundling system 102 can select different combinations of card parameter configurations based on the corresponding card management program. Thus, in some embodiments, the card parameter bundling system 102 utilizes different machine-learning models trained for different goals or different segments to generate card usage scores for generating bundled sets of parameter configurations for the different goals/segments.

Although FIGS. 2-3 illustrate embodiments in which the card parameter bundling system 102 utilizes machine-learning models to select bundled sets of parameter configurations for generating card management programs, the card parameter bundling system 102 can provide tools for generating card management programs without machine-learning models. For instance, the card parameter bundling system 102 can provide tools for selecting from a plurality of predetermined card parameter configurations corresponding to various card parameter categories to generate a bundled set of parameter configurations. Accordingly, a client device can present graphical user interface elements corresponding to predetermined card parameter configurations and detect interactions with the graphical user interface elements to determine a combination of predetermined card parameter configurations in response to manual user selections of the graphical user interface elements. Thus, the card parameter bundling system 102 can generate card management programs based on bundled sets of parameter configurations selected via machine-learning models or by manual user selections.

Figure 4:
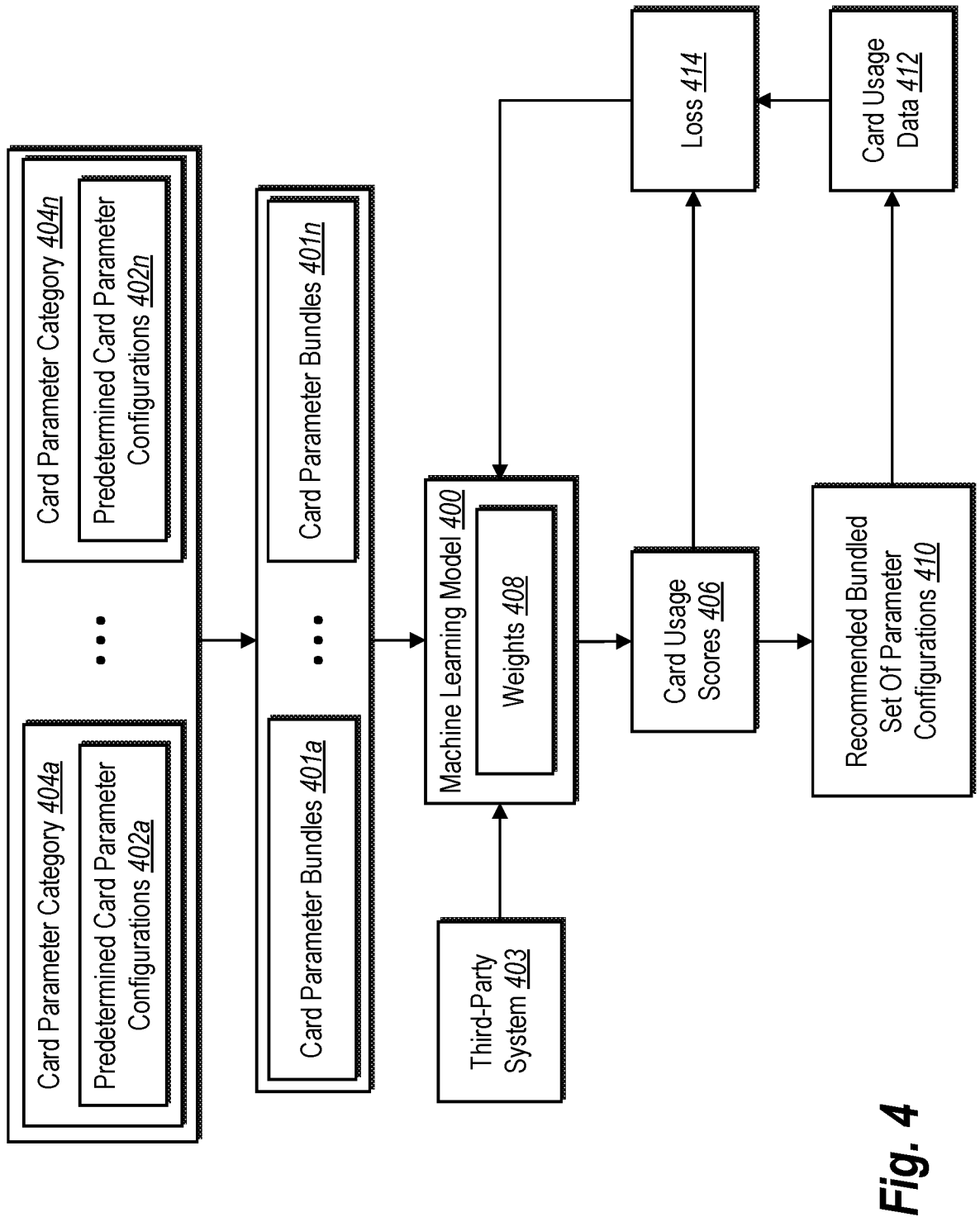
FIG. 4 illustrates a diagram of a process for utilizing a machine-learning model to generate card usage scores from combinations of predetermined card parameter configurations and learning weights based on the generated card usage scores in accordance with one or more implementations.

FIG. 4 illustrates an embodiment of the card parameter bundling system 102 or a card management system (e.g., the card management system 112 of FIG. 1) training a machine-learning model 400 to generate card usage scores for combinations of card parameter configurations. In particular, the card parameter bundling system 102 (or the card management system 112) provides a plurality of card parameter bundles 401a-401n generated from a plurality of predetermined card parameter configurations 402a-402n of a plurality of different card parameter categories 404a-404n to the machine-learning model 400. In one or more embodiments, the card parameter bundling system 102 (or the card management system 112) provides the card parameter bundles 401a-401n including a plurality of combinations of the predetermined card parameter configurations 402a-402n from the card parameter categories 404a-404n to the machine-learning model 400 to generate a plurality of card usage scores 406. In some embodiments, the card parameter bundling system 102 (or the card management system 112) provides data from a third-party source 403 (e.g., a credit bureau system or other lender/issuer system) including end-user data to the machine-learning model 400 for generating the card usage scores 406.

In one or more embodiments, the machine-learning model 400 generates the card usage scores 406 according to a plurality of weights 408. For example, the machine-learning model 400 can include a pre-trained model that the card parameter bundling system 102 utilizes to generate the plurality of card usage scores 406. Accordingly, as previously mentioned, the card parameter bundling system 102 utilizes the machine-learning model 400 to generate the card usage scores 406 to indicate estimated/predicted performance of the combinations of predetermined card parameter configurations 402a-402n within certain constraints according to the weights 408. In some embodiments, the card parameter bundling system 102 utilizes the machine-learning model 400 to generate the card usage scores 406 indicating estimated performance of combinations of card parameter configurations for a specific target segment (e.g., a group of users or an individual user account).

In one or more embodiments, in response to utilizing the machine-learning model 400 to generate the card usage scores 406 based on the combinations of predetermined card parameter configurations 402a-402n, the card parameter bundling system 102 generates a recommended bundled set of parameter configurations 410. Specifically, the card parameter bundling system 102 compares card usage scores for a plurality of combinations to determine a combination with the highest card usage score. The card parameter bundling system 102 provides the corresponding combination as the recommended bundled set of parameter configurations 410 for a card management program.

According to one or more embodiments, the card parameter bundling system 102 also obtains card usage data 412 associated with the recommended bundled set of parameter configurations 410. For instance, in response to an issuer (or the card parameter bundling system 102) applying the selected card parameter configurations from the recommended bundled set of parameter configurations 410 to cards in a card management program, the card parameter bundling system 102 monitors performance of the card management program. In particular, the card parameter bundling system 102 determines an acquisition rate, a retention rate, or other card usage/performance data for cards corresponding to the card management program. Thus, the card parameter bundling system 102 determines a measured performance of the card management system based on corresponding predetermined card parameter configurations. To illustrate, the card parameter bundling system 102 can measure a retention rate for a card management program including a particular annual percentage rate, a particular set of fees, and a particular set of rewards.

In response to determining the card usage data 412, as illustrated in FIG. 4, the card parameter bundling system 102 determines a loss 414 based on the card usage scores 406 and the card usage data 412. In one or more embodiments, the card parameter bundling system 102 determines differences between the card usage scores 406 and the relevant portions of the card usage data 412. To illustrate, the card parameter bundling system 102 can determine a difference between an estimated retention rate and a measured retention rate for a combination of card parameter configurations. The card parameter bundling system 102 determines the loss 414 based on the determined difference. In some instances, the card parameter bundling system 102 utilizes a loss function for determining the loss 414 card usage scores and card usage data corresponding to a plurality of combinations. For instance, the card parameter bundling system 102 can utilize a loss function to determine an average loss, a mean square error loss, a cross entropy loss, or other type of loss for the plurality of combinations.

In one or more embodiments, the card parameter bundling system 102 utilizes the loss 414 to further train the weights 408 of the machine-learning model 400. Specifically, the card parameter bundling system 102 can utilize the loss 414 to adjust one or more of the weights 408 (e.g., associated with classifiers or other parameters) of the machine-learning model 400 by reducing the difference between the card usage scores 406 and the card usage data 412. The card parameter bundling system 102 can measure card data for a number of different bundled sets of parameter configurations for use in further training the weights 408. Additionally, the card parameter bundling system 102 can perform a plurality of training iterations to fine-tune the weights 408 of the machine-learning model 400.

As mentioned, the card parameter bundling system 102 can utilize a plurality of machine-learning models for specific segments, goals, or card usage scores. For example, the card parameter bundling system 102 can train a first machine-learning model to generate estimated card acquisition scores for a segment of users based on combinations of card parameter configurations. Additionally, the card parameter bundling system 102 can also train a second machine-learning model to generate estimated card retention scores for the segment of users based on combinations of card parameter configurations. Furthermore, the card parameter bundling system 102 can train additional machine-learning models for generating specific card usage scores for different segments of users. In some embodiments, the card parameter bundling system 102 trains an individual machine-learning model for each user account (or for a user with specific attributes). The card parameter bundling system 102 can thus provide customized card management programs for individual accounts or groups of accounts by utilizing a plurality of separately trained machine-learning models.

For example, the card parameter bundling system 102 can train the machine-learning model 400 (or an additional machine-learning model) to learn features of users. In one or more embodiments, the card parameter bundling system 102 trains a machine-learning model to select a segment of users for a particular combination of card parameter configurations (e.g., by selecting a bundled set of parameter configurations and then selecting the target segment). In some instances, the card parameter bundling system 102 utilizes the machine-learning model to identify a segment of users for associating with a particular bundled set of parameter configurations based on behaviors of the users or other features. To illustrate, the machine-learning model can utilize learned features of users to determine that a particular group of users corresponds to a bundled set of parameter configurations.

In one or more instances, the learned features can include, but are not limited to, user demographics such as age or geographic location, user economic data, user behavior (e.g., spending/travel habits), or user-defined preferences. Furthermore, the card parameter bundling system 102 can train the machine-learning model to select a user segment for a bundled set of parameter configurations based on combinations of user features and card parameter configuration features. To illustrate, the card parameter bundling system 102 can train the machine-learning model learn features indicating user attributes or behavior in connection with particular card parameter configurations. Thus, the card parameter bundling system 102 can flexibly and dynamically select a user segment for a given bundled set of card parameters based on the learned user features and learned features of card parameter configurations.

The card parameter bundling system 102 can also use information about a single user or a group of users (e.g., learned features) to select a specific bundled set of parameters for the user or group of users. Thus, the card parameter bundling system 102 can target a single user with a customized bundled set of parameter configurations according to the learned features for that user. Additionally, the card parameter bundling system 102 can target a separate user with a separate customized bundled set of parameter configurations according to the learned features for the separate user. Similarly, the card parameter bundling system 102 can target separate groups of users with different bundled sets of parameter configurations according to the separately learned features for each group.

In additional implementations, the card parameter bundling system 102 can target different sizes of segments for bundled sets of parameter configurations. In particular, as mentioned, the card parameter bundling system 102 can utilize one or more machine-learning models to target large segments of users (e.g., a machine-learning model trained in connection with hundreds of thousands of users in a given segment) for specific bundled sets of parameter configurations. Alternatively, the card parameter bundling system 102 can utilize one or more machine-learning models to target small segments of users (e.g., a machine-learning model trained in connection with a few users or a single user in a given segment) for bundled sets of parameter configurations.

Figure 5:
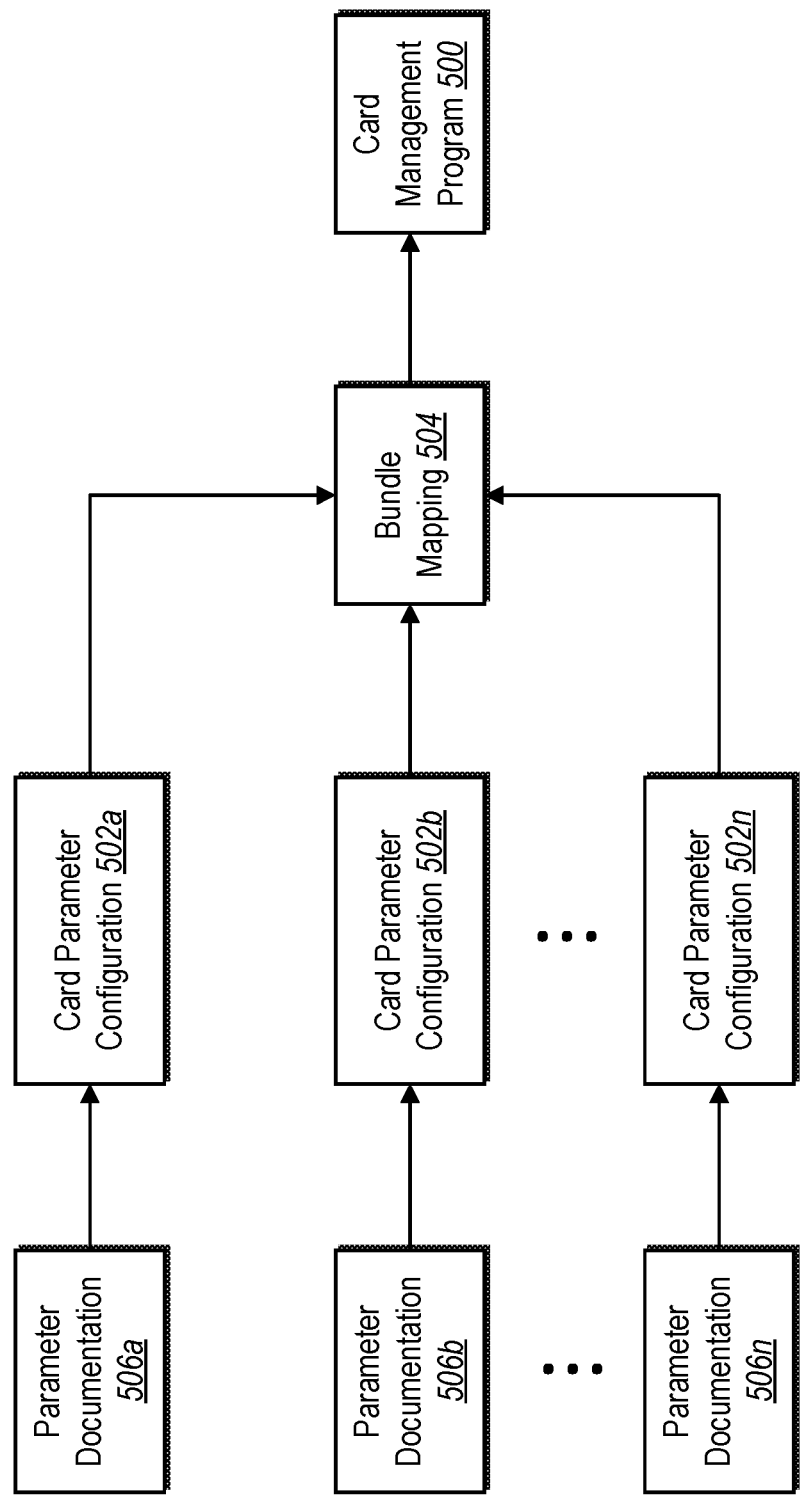
FIG. 5 illustrates a diagram of the card parameter bundling system mapping card parameter configurations for generating a card management program in accordance with one or more implementations.

As previously described, the card parameter bundling system 102 generates a bundled set of parameter configurations based on a combination of predetermined card parameter configurations and an output of a machine-learning model. In one or more embodiments, the card parameter bundling system 102 generates the bundled set by mapping the predetermined card parameter configurations in connection with a card management program. FIG. 5 illustrates that the card parameter bundling system 102 generates a bundled set of parameter configurations for a card management program 500. The card parameter bundling system 102 utilizes the mapping to apply a plurality of different card parameter configurations to cards (e.g., to accounts associated with the cards).

FIG. 5 illustrates that the card parameter bundling system 102 determines a plurality of card parameter configurations 502a-502n. According to one or more embodiments, as mentioned, the card parameter configurations 502a-502n include previously generated (e.g., predetermined) card parameter configurations for a plurality of different card parameter categories. More specifically, one or more entities generate the card parameter configurations 502a-502n for possibly applying to one or more cards in connection with the card management program 500 or other card management programs.

As mentioned, conventional systems typically utilize methods for card management that require significant and costly communications/collaboration between different entities or sub-entities. The card parameter bundling system 102 utilizes predetermined card parameter configurations, along with the corresponding parameter documentation, to more efficiently and flexibly combine card parameter configurations to generate, modify, and/or manage card management programs. In particular, as illustrated in FIG. 5, the card parameter bundling system 102 generates a bundle mapping 504 for mapping predetermined card parameter configurations to the card management program 500.

In one or more embodiments, the card parameter bundling system 102 assigns (or obtains) separate parameter configuration identifiers for the card parameter configurations 502a-502n. The card parameter bundling system 102 can generate the bundle mapping 504 by mapping the parameter configuration identifiers to a card management program 500 (e.g., via a program identifier). Thus, for reach card management program, the card parameter bundling system 102 can assign a unique program identifier and associate the corresponding combination of card parameter configurations via the corresponding parameter configuration identifiers. In some embodiments, the card parameter bundling system 102 associates the card parameter configurations with a bundle mapping identifier and then associates the bundle mapping identifier with the program identifier. In this manner, the card parameter bundling system 102 can associate each card management program with the corresponding bundled set of parameter configurations.

In connection with generating the card parameter configurations 502a-502n, the entities can also generate or provide additional information associated with the card parameter configurations 502a-502n. For example, as illustrated in FIG. 5, one or more entities generate parameter documentation 506a-506n associated with the card parameter configurations. In some embodiments, parameter documentation includes one or more digital documents including content indicating terms, conditions, disclosures, agreements, contracts, or other written content explaining a card parameter configuration or setting limits, benefits, or boundaries associated with the card parameter configuration. In some embodiments, parameter documentation is required according to industry standards (e.g., payment card industry "PCI" standards) or laws. In some instances, the parameter documentation for one or more card parameter configurations can be finalized and approved (e.g., at the entity) prior to including the card parameter configurations in one or more bundled sets of parameter configurations. By providing approval of the card parameter configurations and parameter documentation ahead of time, the card parameter bundling system 102 can ensure compliance for any combination of predetermined card parameter configurations.

By generating the parameter documentation ahead of time for each card parameter configuration, the card parameter bundling system 102 can ensure that the card parameter configurations 502a-502n are ready for deployment with a card management program 500. To illustrate, when generating the bundle mapping 504, the card parameter bundling system 102 can also map the corresponding parameter documentation for a given card parameter configuration to the card management program 500. The card parameter bundling system 102 can thus include the parameter documentation 506a-506n for the card parameter configurations 502a-502n in a simple and efficient manner that eliminates the need for separate entities to provide further input into the generation of a card management program 500, which reduces the time and device or system communication/processing resources each time the card parameter bundling system 102 generates or deploys a card management program.

In addition to mapping separate card parameter configurations and corresponding parameter documentation to a card management program, the card parameter bundling system 102 can also generate combined documentation for a card management program. For instance, in response to associating parameter documentation for a plurality of card parameter configurations with a card management program, the card parameter bundling system 102 can generate a combined digital document including the parameter documentation for each card parameter configuration. To illustrate, the card parameter bundling system 102 can determine a position and order for inserting the product documentation for a given bundle into a single document. Alternatively, the card parameter bundling system 102 can generate modularized parameter documentation that separates the parameter documentation for card parameter configurations in a bundle into different digital documents or portions of a document.

Additionally, the card parameter bundling system 102 maintains an audit history of changes to card parameter configurations and parameter documentation. In particular, each time an entity modifies a card parameter configuration (and the corresponding parameter documentation), the card parameter bundling system 102 generates a database entry or other data structure (e.g., a spreadsheet) indicating the changes made. For example, the card parameter bundling system 102 maintains a lineage of relationships between bundles (e.g., cloned bundles) and predetermined card parameter configurations in the dataset for easy management of changes to parameters or policies and values over time for one or more card management programs. Furthermore, the card parameter bundling system 102 can provide tools for accessing previous versions of card parameter configurations or parameter documentation.

Figure 6:
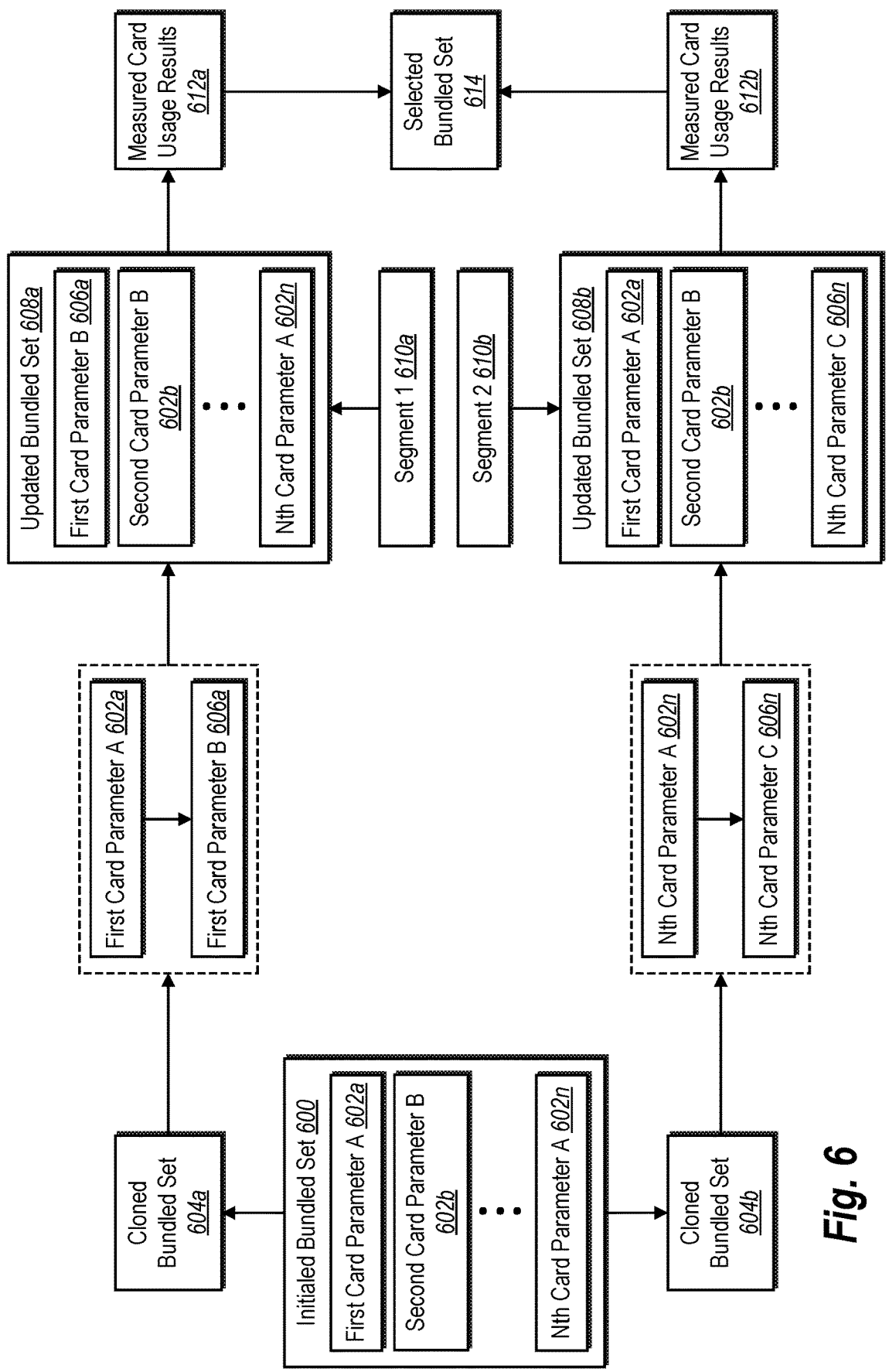
FIG. 6 illustrates a diagram of the card parameter bundling system utilizing experimentation to select a bundled set of parameters for generating a new card management program from an existing card management program in accordance with one or more implementations.

In one or more embodiments, the card parameter bundling system 102 provides tools for testing or experimenting on different bundled sets of parameter configurations with one or more target segments. FIG. 6 illustrates an embodiment of the card parameter bundling system 102 generating a plurality of different bundled sets of parameter configurations from an existing bundled set of parameter configurations. Additionally, FIG. 6 illustrates that the card parameter bundling system 102 applies the bundled sets to cards for different segments for selecting a bundled set to apply to a card management program.

As illustrated in FIG. 6, the card parameter bundling system 102 determines an initial bundled set 600 including a plurality of parameter configurations. For example, the initial bundled set 600 includes a plurality of card parameters 602a-602n corresponding to various card parameter categories. In one or more embodiments, a first card parameter 602a includes a specific parameter configuration ("A") from a plurality of possible parameter configurations of a first card parameter category. Additionally, a second card parameter 602b includes a specific parameter configuration ("B") from a plurality of possible parameter configurations of a second card parameter category. As shown, an Nth card parameter 602n includes a specific parameter configuration ("A") from a plurality of possible parameter configurations of an nth card parameter category.

In one or more embodiments, the card parameter bundling system 102 determines a plurality of different combinations of card parameter configurations for experimentation. To illustrate, the card parameter bundling system 102 determines the combinations of parameter configurations in response to one or more requests (e.g., from a client device) to test the combinations. Alternatively, the card parameter bundling system 102 determines the combinations of parameter configurations by automatically determining varying combinations utilizing a machine-learning model (e.g., by selecting combinations similar to the initial bundled set 600 and with the highest card usage scores).

According to one or more embodiments, the card parameter bundling system 102 generates a plurality of different bundled sets based on the different combinations. Specifically, as illustrated in FIG. 6, the card parameter bundling system 102 copies and clones the initial bundled set 600. For instance, the card parameter bundling system 102 copies a bundle mapping of the card parameter configurations in the initial bundled set 600 and generates clones based on the copied bundle mapping. To illustrate, the card parameter bundling system 102 generates a first cloned bundled set 604a corresponding to a first combination of parameter configurations and a second cloned bundled set 604b corresponding to a second combination of parameter configurations. By copying and cloning the initial bundled set 600, the card parameter bundling system 102 can generate modified versions of the initial bundled set 600 without changing the initial bundled set 600 itself (and corresponding cards and accounts).

In one or more embodiments, the card parameter bundling system 102 determines a first variant of the initial bundled set 600 by replacing, within the first cloned bundled set 604a, the first card parameter 602a with a new first card parameter 606a. In particular, the new first card parameter 606a can include a specific parameter ("B") from the first card parameter category (e.g., the same card category as the first card parameter 602a). To illustrate, the card parameter bundling system 102 can replace a first pricing configuration with a second pricing configuration. The card parameter bundling system 102 can also determine a second variant of the initial bundled set 600 by replacing, within the second cloned bundled set 604b, the nth card parameter 602n with a new nth card parameter 606n. As shown, the new nth card parameter 606n can include a specific parameter ("C") from the nth card parameter category. To illustrate, the card parameter bundling system 102 can replace a first rewards configuration with a second rewards configuration. In some embodiments, the card parameter bundling system 102 can also remove a particular parameter configuration from a bundled set without adding a new parameter configuration in its place.

The card parameter bundling system 102 can also store a lineage of changes to the initial bundled set 600 and updated bundled sets with a mapping or change history corresponding to the initial bundled set 600. In one or more embodiments, the card parameter bundling system 102 can provide tools to access a lineage of a particular bundled set, such as via an API. For instance, in response to an API call to obtain a lineage of changes for a particular bundled set (e.g., the initial bundled set 600), the card parameter bundling system 102 can access the lineage of changes and return information associated with the cloned bundled sets 604a-604b and the corresponding changes.

In addition to replacing a card parameter category in a cloned bundled set with a new card parameter category, the card parameter bundling system 102 generates (e.g., updates) mappings for the cloned bundled sets based on the modified card parameter configurations. For example, as illustrated in FIG. 6, the card parameter bundling system 102 generates a first updated bundled set 608a including the modified card parameters of the first cloned bundled set 604a by generating a mapping for the new first card parameter 606a. Additionally, the card parameter bundling system 102 generates a second updated bundled set 608b including the modified card parameters of the second cloned bundled set 604b by generating a mapping for the new nth card parameter 606n.

According to one or more embodiments, the card parameter bundling system 102 utilizes the updated bundled sets 608a-608b to test performance of the variants with different user segments. For example, the card parameter bundling system 102 can select a first segment 610a (e.g., a group of users corresponding to a first set of characteristics) for testing the first updated bundled set 608a. The card parameter bundling system 102 can also select a second segment 610b for testing the second updated bundled set 608b. In one or more embodiments, the card parameter bundling system 102 tests the performance by generating card management programs for the updated bundled sets and deploying the card management programs to the selected segments. In some embodiments, the card parameter bundling system 102 deploys the card management programs by providing tools to an issuer or other system to provide offers for cards associated with the card management programs and manage the cards via the card parameter bundling system 102.

In response to deploying the updated bundled sets 608a-608b to the segments 610a-610b, the card parameter bundling system 102 can determine the performance of each corresponding card management program. For example, as illustrated in FIG. 6, the card parameter bundling system 102 determines first measured card usage results 612a corresponding to the first updated bundled set 608a. Additionally, the card parameter bundling system 102 determines second measured card usage results 612b corresponding to the second updated bundled set 608b. In one or more embodiments, the card parameter bundling system 102 determines card usage results related to acquisition rates, retention rates, conversion rates, upgrade/downgrade rates, or other data associated with cards or user accounts in connection with the card management programs.

In alternative embodiments, the card parameter bundling system 102 utilizes machine-learning to estimate the card usage results for variants of the initial bundled set 600. For example, the card parameter bundling system 102 utilizes one or more machine-learning models to generate estimated card usage scores for the first updated bundled set 608a and the second updated bundled set 608b. The card parameter bundling system 102 can utilize the machine-learning model(s) to estimate performance of the first updated bundled set 608a and the performance of the second updated bundled set 608b with the same or different segments.

In one or more embodiments, the card parameter bundling system 102 utilizes the card usage results for the card management programs to select a combination of parameter configurations for deploying on a larger scale. For instance, the card parameter bundling system 102 compares the performance of the card management programs based on the first measured card usage results 612a and the second measured card usage results 612b. To illustrate, in response to determining that the card management program corresponding to the first updated bundled set 608a had a better performance with regard to a particular card usage parameter, the card parameter bundling system 102 can select the first updated bundled set 608a (e.g., as a selected bundled set 614) for applying to a card management program for a larger segment (e.g., a segment that includes the first segment 610a and the second segment 610b).

In some embodiments, the card parameter bundling system 102 utilizes testing of different combinations of card parameter configurations to determine optimal combinations for specific segments. In particular, the card parameter bundling system 102 can provide tools to issuers to select a bundled set of parameter configurations for a segment with a particular set of attributes or a different bundled set of parameter configurations for a segment with a different set of attributes based on tested performances. Additionally, by providing tools for modifying existing bundled sets of parameter configurations (e.g., via copying and cloning) with different predetermined card parameter configurations, the card parameter bundling system 102 provides granular customization of card management programs. To illustrate, the card parameter bundling system 102 can customize card management programs on an individual user basis or for larger groups of users.

Figure 7:
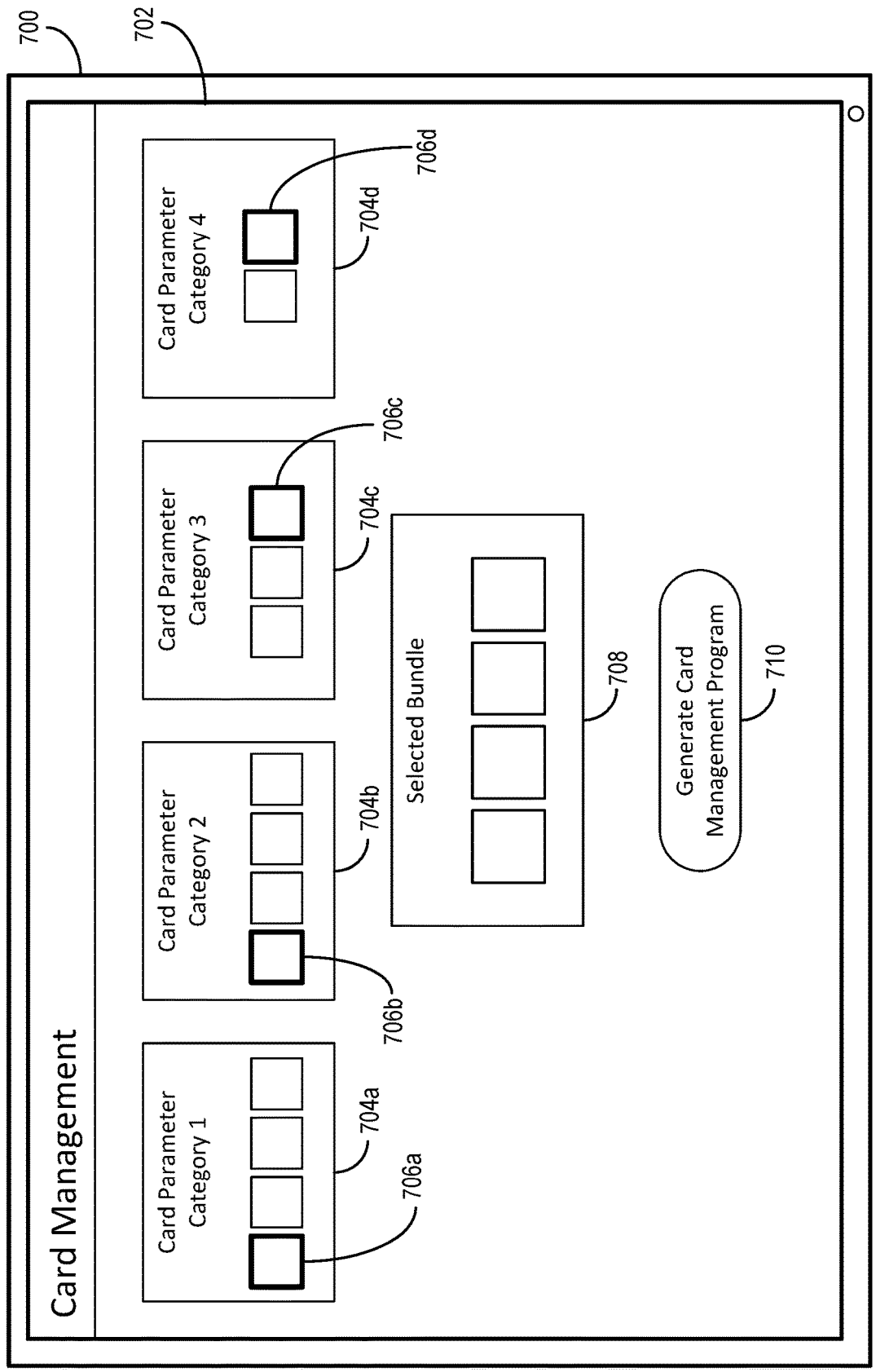
FIG. 7 illustrates a graphical user interface for generating a card management program in accordance with one or more implementations.
Figure 8:
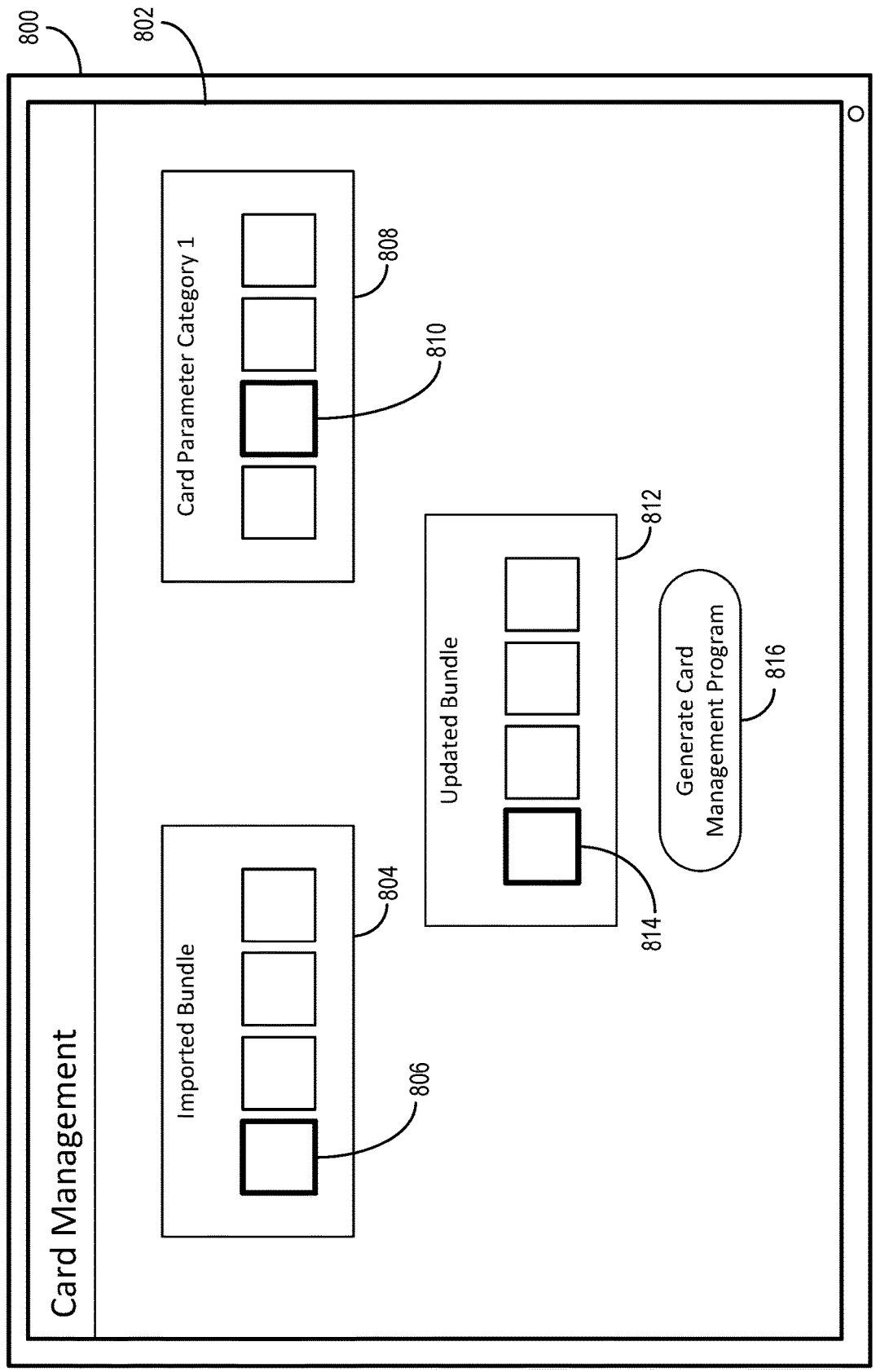
FIG. 8 illustrates a graphical user interface for modifying a card management program in accordance with one or more implementations.

As mentioned, the card parameter bundling system 102 provides tools for creating and modifying bundled sets of parameter configurations for card management programs. FIG. 7 illustrates a graphical user interface for generating a bundled set of parameter configurations based on a plurality of predetermined card parameter configurations. FIG. 8 illustrates a graphical user interface for modifying an existing bundled set of parameter configurations to create an updated bundled set of parameter configurations.

As mentioned, FIG. 7 illustrates a graphical user interface for creating a bundled set of parameter configurations. Specifically, FIG. 7 illustrates a client device 700 (e.g., a desktop device) displaying a graphical user interface 702 of a client application associated with card management programs. The client application can include tools for generating and managing card management programs (e.g., developing, deploying, and tracking card management programs). For example, the card parameter bundling system 102 provides a plurality of predetermined card parameter configurations to the client device 700 in connection with generating a card management program.

As shown, the client device 700 displays a plurality of category elements 704a-704d including a plurality of predetermined card parameter configurations for selecting possible parameter configurations. To illustrate, the card parameter bundling system 102 displays a first card parameter category 704a including a plurality of predetermined card parameter configurations from which a user can select. For instance, the client device 700 can detect an interaction (e.g., via a mouse or touch input) with a first parameter element 706a indicating a selection of a first predetermined card parameter configuration. Additionally, the client device 700 can display a second card parameter category 704b including a plurality of predetermined card parameter configurations and detect an interaction with a second parameter element 706b. Similarly, the card parameter bundling system 102 can detect interactions with a third parameter element 706c and a fourth parameter element 706d from a third card parameter category 704c and a fourth card parameter category 704d, respectively.

In response to detecting selections of a plurality of parameter elements from the plurality of card parameter categories, the card parameter bundling system 102 can generate a bundled set of parameter configurations. Specifically, FIG. 7 illustrates that the client device 700 displays a selected bundle 708 including the predetermined card parameter configurations from the plurality of card parameter categories. More specifically, the selected bundle 708 displayed at the client device 700 includes the first predetermined card parameter configuration corresponding to the first parameter element 706a, a second predetermined card parameter configuration corresponding to the second parameter element 706b, etc.

FIG. 7 also illustrates that the client device 700 displays a card management program element 710 to generate a card management program based on the selected bundle 708. In particular, in response to an interaction with the card management program element 710, the client device 700 sends a request to the card parameter bundling system 102 to generate a card management program including the predetermined card parameter configurations in the selected bundle 708. For example, the card parameter bundling system 102 generates a mapping including the selected predetermined card parameter configurations and ties the mapping to a card management program. In additional embodiments, the card parameter bundling system 102 retrieves parameter documentation and other data associated with the selected predetermined card parameter configurations to include in the mapping.

FIG. 8 illustrates a client device 800 including a graphical user interface 802 of a client application associated with card management programs. As mentioned, in one or more embodiments, the card parameter bundling system 102 provides tools for modifying existing bundled sets of parameter configurations. As illustrated, the client device 800 can display an imported bundle 804 including parameter configurations for an existing card management program (e.g., a card management program that has been deployed for a plurality of cards associated with user accounts). The imported bundle 804 includes a plurality of card parameter configurations that determine usage limitations and benefits associated with the card management program.

In one or more embodiments, in response to a selection of a parameter element 806 corresponding to a card parameter configuration in the imported bundle 804, the client device 800 can display a card parameter category 808 associated with the selected parameter element 806. For instance, the client device 800 can communicate with the card parameter bundling system 102 to obtain a plurality of additional predetermined card parameter configurations in the same category as the selected card parameter configuration. To illustrate, in response to determining that the selected card parameter configuration corresponds to a risk management category, the card parameter bundling system 102 provides a plurality of additional card parameter configurations from the risk management category for display at the client device 800. In one or more embodiments, the card parameter bundling system 102 selects a subset of available predetermined card parameter configurations for the category based on a similarity to the card parameter configuration in the imported bundle 804. Alternatively, the card parameter bundling system 102 utilizes a machine-learning model to select additional card parameter configurations for display based on card usage scores for combinations of parameter configurations and/or similar segments.

In one or more embodiments, the client device 800 detects a selection of a parameter element 810 from the card parameter category 808. In particular, the card parameter bundling system 102 determines that the card parameter bundling system 102 selects the parameter element 810 corresponding to an additional predetermined card parameter configuration in the card parameter category 808. In response to the selection of the additional predetermined card parameter configuration (e.g., based on the interaction with the parameter element 810), the client device 800 provides the selected predetermined card parameter configuration to the card parameter bundling system 102. The card parameter bundling system 102 can provide an updated bundle 812 for display at the client device 800. As shown in FIG. 8, the client device 800 displays the updated bundle 812 including an indicator 814 of the predetermined card parameter configuration corresponding to the selected parameter element 810 replacing the card parameter configuration of the parameter element 806 in the imported bundle 804.

Furthermore, FIG. 8 illustrates a card management program element 816 for generating a new card management program based on the updated bundle 812. Specifically, the card parameter bundling system 102 generates a new card management program by copying and cloning the imported bundle 804. The card parameter bundling system 102 updates a mapping associated with the cloned bundle by replacing the original card parameter configuration with the selected predetermined card parameter configuration. Additionally, the card parameter bundling system 102 can replace any additional parameter documentation or data associated with the original card parameter configuration with parameter documentation or data associated with the selected predetermined card parameter configuration. The card parameter bundling system 102 can generate the new card management program based on the updated mapping corresponding to the updated bundle 812.

As mentioned, a card management program can correspond to reward programs associated with cards. Accordingly, the above figures and the corresponding description indicate that the card parameter bundling system 102 can provide generation and management of card reward programs. For instance, the card parameter bundling system 102 can determine a plurality of card reward configurations (e.g., benefits, requirements, limitations) associated with one or more card reward programs. The card parameter bundling system 102 can also utilize machine-learning to determine one or more bundled sets of card reward configurations from a number of different card reward categories to generate recommendations for a card reward program. Thus, the card parameter bundling system 102 provides automatic creation of card reward programs including various rewards benefits, requirements, and limitations based on the performance of past card reward programs and target segment characteristics.

Turning now to FIG. 9, this figure shows a flowchart of a series of acts 900 of utilizing machine-learning to generate a card management program from a plurality of predetermined card parameter configurations. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable storage medium can comprise instructions, that when executed by one or more processors, cause a computing device to perform the acts of FIG. 9. In still further embodiments, a system can perform the acts of FIG. 9.

As shown, the series of acts 900 includes an act 902 of determining predetermined card parameter configurations for generating a card management program. For example, act 902 involves determining, in response to a request to generate a card management program, a plurality of predetermined card parameter configurations corresponding to a plurality of different card parameter categories. Act 902 can involve determining the plurality of predetermined card parameter configurations from a plurality of computing devices associated with a plurality of different entities.

Act 902 can involve determining a first plurality of predetermined card parameter configurations for a first card parameter category. Act 902 can also involve determining a second plurality of predetermined card parameter configurations for a second card parameter category different than the first card parameter category.

The series of acts 900 also includes an act 904 of generating card usage scores for combinations of predetermined card parameter configurations utilizing a machine-learning model. For example, act 904 involves generating, utilizing a machine-learning model comprising trained weights based on a historical card dataset, a plurality of card usage scores for combinations of predetermined card parameter configurations from the plurality of predetermined card parameter configurations.

Act 904 can involve generating, utilizing the machine-learning model, card usage scores for a plurality of combinations of card parameter configurations from the first plurality of predetermined card parameter configurations and the second plurality of predetermined card parameter configurations. For example, act 904 can involve generating, utilizing the machine-learning model, a card usage score for a combination of a first card parameter configuration of the first plurality of predetermined card parameter configurations and a second card parameter configuration of the second plurality of predetermined card parameter configurations.

Act 904 can involve generating a card acquisition score indicating an estimated acquisition rate associated with a combination of predetermined card parameter configurations from the plurality of predetermined card parameter configurations. Act 904 can involve generating a card retention score indicating an estimated retention rate associated with the combination of predetermined card parameter configurations from the plurality of predetermined card parameter configurations.

Additionally, the series of acts 900 includes an act 906 of generating a bundled set of parameter configurations based on the card usage scores. For example, act 906 involves generating a bundled set of parameter configurations comprising a combination of a subset of the plurality of predetermined card parameter configurations based on the plurality of card usage scores generated utilizing the machine-learning model.

Act 906 can involve comparing a first card usage score for a first combination of predetermined card parameter configurations to a plurality of additional card usage scores for a plurality of additional combinations of predetermined card parameter configurations. For example, act 906 can involve comparing a first card usage score for a first combination of predetermined card parameter configurations to a second card usage score for a second combination of predetermined card parameter configurations. Act 906 can also involve generating the bundled set of parameter configurations from the first combination of predetermined card parameter configurations in response to the first card usage score being higher than the plurality of additional card usage scores.

The series of acts 900 further includes an act 908 of providing the bundled set of parameter configurations for display at a client device. For example, act 908 involves providing, for display at a client device, the bundled set of parameter configurations as a recommendation for the card management program.

In one or more embodiments, the series of acts 900 includes providing, for display at the client device, a plurality of graphical user interface elements of predetermined card parameter configurations for the bundled set of parameter configurations. For example, the series of acts 900 can include generating, for display at the client device, one or more graphical user interface elements corresponding to one or more predetermined card parameter configurations of the plurality of predetermined card parameter configurations. The series of acts 900 can include determining, in response to an interaction with one or more of the plurality of graphical user interface elements, a modified bundled set of parameter configurations comprising one or more replacement predetermined card parameter configurations. For example, the series of acts 900 can include modifying the bundled set of parameter configurations in response to one or more user interactions with the one or more graphical user interface elements. The series of acts 900 can also include generating the card management program based on the modified bundled set of parameter configurations.

The series of acts 900 can include receiving a request to generate a new card management program by modifying a selected card parameter configuration of the bundled set of parameter configurations. For example, the series of acts 900 can include receiving a request to modify the card management program by replacing a selected card parameter configuration of the bundled set of parameter configurations with an additional predetermined card parameter configuration of the plurality of predetermined card parameter configurations. Additionally, the series of acts 900 can include generating a copy of the bundled set of parameter configurations, and replacing, within the copy of the bundled set of parameter configurations, the selected card parameter configuration with the additional predetermined card parameter configuration of the plurality of predetermined card parameter configurations. The series of acts 900 can also include generating the new card management program based on an updated bundled set of parameter configurations comprising the additional predetermined card parameter configuration.

The series of acts 900 can include determining, for the card management program, one or more measured card usage data based on the bundled set of parameter configurations. For example, the series of acts 900 can include determining, for the card management program, a measured card acquisition rate and a measured card retention rate based on the bundled set of parameter configurations. The series of acts 900 can also include determining a loss based on the one or more measured card usage data and a card usage score generated by the machine-learning model for the combination of the subset of the plurality of predetermined card parameter configurations. For example, the series of acts 900 can include determining a loss based on the measured card acquisition rate, the measured card retention rate, and card usage scores generated by the machine-learning model for the combination of the subset of the plurality of predetermined card parameter configurations. Additionally, the series of acts 900 can include modifying the trained weights of the machine-learning model according to the loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
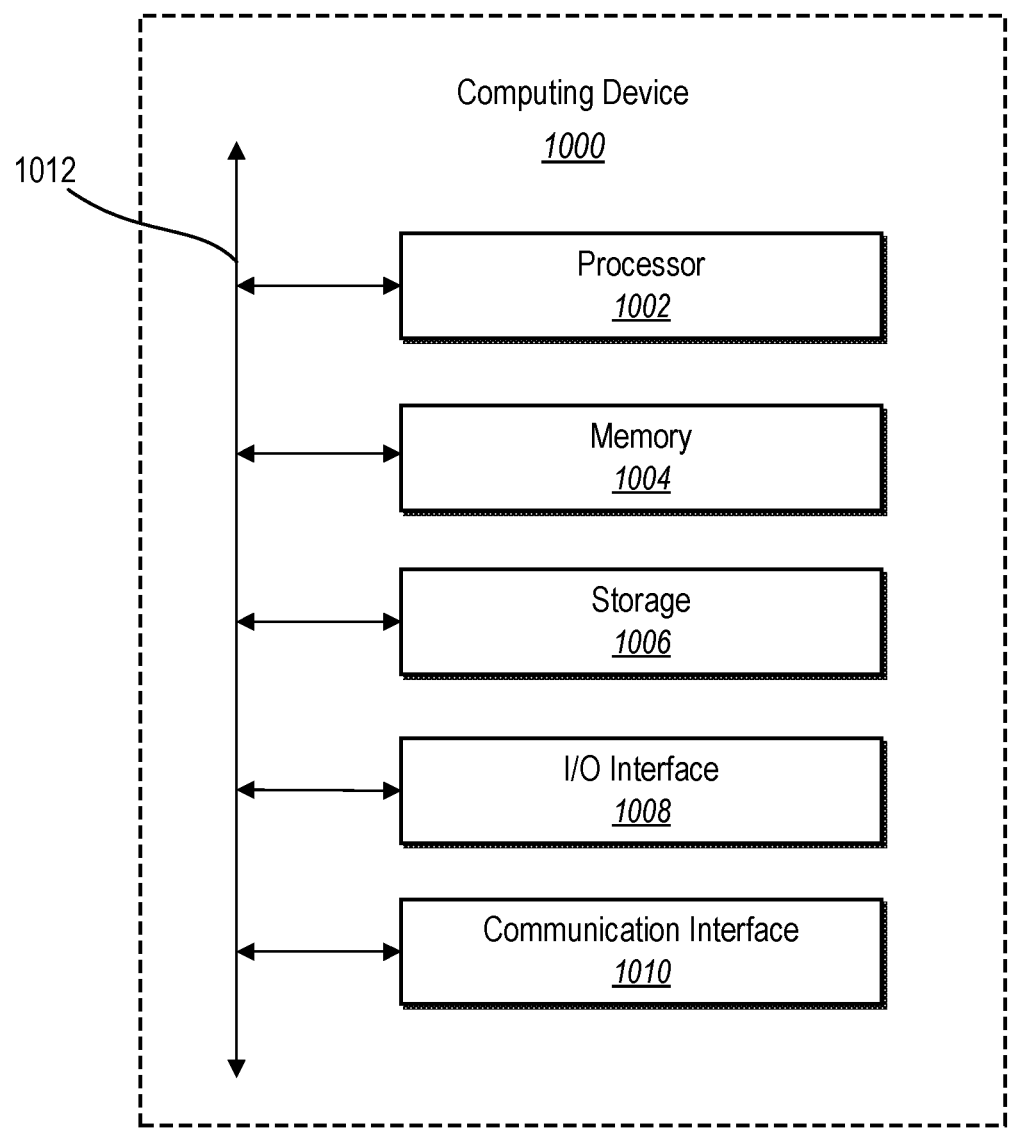
FIG. 10 illustrates a block diagram of an exemplary computing device in accordance with one or more implementations.

FIG. 10 illustrates a block diagram of exemplary computing device 1000 that may be configured to perform one or more of the processes described above. One will appreciate that one or more computing devices such as the computing device 1000 may implement the system(s) of FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   determining, by one or more processors in response to a request to generate a card management program comprising software and data that controls when and how one or more cards are used to engage in payment transactions, combinations of a plurality of predetermined card parameter configurations corresponding to a plurality of different card parameter categories, wherein the plurality of predetermined card parameter configurations indicates usage characteristics of the one or more cards in relation to using the one or more cards to engage in payment transactions;
   generating, by the one or more processors utilizing a machine-learning model comprising trained weights based on a historical card dataset including card usage data for a plurality of card management programs, a plurality of card usage scores for the combinations of the plurality of predetermined card parameter configurations from the plurality of predetermined card parameter configurations by encoding features of the combinations of the plurality of predetermined card parameter configurations according to the trained weights, wherein a card usage score of the plurality of card usage scores represents, for a combination of predetermine card parameter configurations, a combined score value based on:
  an estimated card acquisition rate defining a rate at which users presented with an option to obtain a card sign up for a card; and
  an estimated card retention rate defining a rate at which users keep an account for the card for a specific amount of time;
generating, by the one or more processors, a bundled set of parameter configurations for applying to the card indicating when and how the card is used, the bundled set of parameter configurations comprising a combination of a subset of the plurality of predetermined card parameter configurations in response to determining that the combination of the subset of the plurality of predetermined card parameter configurations has a highest combined score value of the plurality of card usage scores generated utilizing the machine-learning model;
providing, by the one or more processors for display at a client device, the bundled set of parameter configurations as a recommendation for the card management program in connection with providing the card to one or more users;
determining measured card usage data comprising a measured acquisition rate and a measured retention rate for the card management program based on the bundled set of parameter configurations being applied to the card management program;
determining a loss based on the measured card usage data and a card usage score generated by the machine-learning model for the combination of the subset of the plurality of predetermined card parameter configurations by:
  determining, from the card usage score generated by the machine-learning model and the measured card usage data, a first difference between an estimated acquisition rate and the measured acquisition rate and a second difference between an estimated retention rate and the measured retention rate; and
  utilizing a loss function to determine the loss utilizing the first difference and the second difference; and
modifying the trained weights of the machine-learning model according to the loss to reduce the first difference between the estimated acquisition rate and the measured acquisition rate and the second difference between the estimated retention rate and the measured retention rate.

2. The computer-implemented method of claim 1, wherein determining the plurality of predetermined card parameter configurations comprises:
  determining a first plurality of predetermined card parameter configurations for a first card parameter category;
  determining a second plurality of predetermined card parameter configurations for a second card parameter category different than the first card parameter category; and
  generating the plurality of card usage scores for the plurality of predetermined card parameter configurations from the first plurality of predetermined card parameter configurations of the first card parameter category and the second plurality of predetermined card parameter configurations of the second card parameter category.

3. The computer-implemented method of claim 1, wherein:
  generating the plurality of card usage scores comprises generating, utilizing the machine-learning model, a card usage score for the combination of the subset of the plurality of predetermined card parameter configurations for a target segment comprising a group of user accounts according to the trained weights of the machine-learning model; and
  generating the bundled set of parameter configurations comprises:
    comparing the card usage score of the combination of the subset of the plurality of predetermined card parameter configurations to one or more additional card usage scores of one or more additional combinations of additional subsets of the plurality of predetermined card parameter configurations; and
    generating the bundled set of parameter configurations from the combination of the subset of the plurality of predetermined card parameter configurations in response to the card usage score being higher than the one or more additional card usage scores.

4. The computer-implemented method of claim 1, wherein generating the plurality of card usage scores comprises:
  generating a card acquisition score indicating an estimated acquisition rate associated with a combination of predetermined card parameter configurations from the plurality of predetermined card parameter configurations; and
  generating a card retention score indicating an estimated retention rate associated with the combination of predetermined card parameter configurations from the plurality of predetermined card parameter configurations.

5. The computer-implemented method of claim 1, wherein generating the bundled set of parameter configurations comprises:
  comparing a first card usage score for a first combination of predetermined card parameter configurations to a second card usage score for a second combination of predetermined card parameter configurations; and
  generating the bundled set of parameter configurations from the first combination of predetermined card parameter configurations in response to the first card usage score being higher than the second card usage score.

6. The computer-implemented method of claim 1, wherein determining the plurality of predetermined card parameter configurations comprises determining the plurality of predetermined card parameter configurations from a plurality of computing devices associated with a plurality of different card parameter categories.

7. The computer-implemented method of claim 1, further comprising:
  providing, for display at the client device, a plurality of graphical user interface elements of predetermined card parameter configurations for the bundled set of parameter configurations;

determining, in response to an interaction with one or more of the plurality of graphical user interface elements, a modified bundled set of parameter configurations comprising one or more replacement predetermined card parameter configurations; and generating the card management program based on the modified bundled set of parameter configurations.

8. The computer-implemented method of claim 1, further comprising:

receiving a request to generate a new card management program by modifying a selected card parameter configuration of the bundled set of parameter configurations;

generating a copy of the bundled set of parameter configurations;

replacing the selected card parameter configuration with an additional predetermined card parameter configuration of the plurality of predetermined card parameter configurations; and generating the new card management program based on an updated bundled set of parameter configurations comprising the additional predetermined card parameter configuration.

9. The computer-implemented method of claim 1, further comprising:

modifying the trained weights of the machine-learning model based on the measured card usage data to generate card usage scores for a first target segment; and modifying trained weights of an additional machine-learning model based on additional measured card usage data to generate additional card usage scores for a second target segment.

10. A system comprising:

at least one processor; and a non-transitory computer readable storage medium comprising instructions that, when executed by the at least one processor, cause the system to:

determine, in response to a request to generate a card management program comprising software and data that controls when and how one or more cards are used to engage in payment transactions, combinations of a plurality of predetermined card parameter configurations corresponding to a plurality of different card parameter categories, wherein the plurality of predetermined card parameter configurations indicates usage characteristics of the one or more cards in relation to using the one or more cards to engage in payment transactions;

generate, utilizing a machine-learning model comprising trained weights based on a historical card dataset including card usage data for a plurality of card management programs, a plurality of card usage scores for the combinations of the plurality of predetermined card parameter configurations from the plurality of predetermined card parameter configurations by encoding features of the combinations of the plurality of predetermined card parameter configurations according to the trained weights, wherein a card usage score of the plurality of card usage scores represents, for a combination of predetermine card parameter configurations, a combined score value based on:

an estimated card acquisition rate defining a rate at which users presented with an option to obtain a card sign up for a card; and an estimated card retention rate defining a rate at which users keep an account for the card for a specific amount of time;

generate a bundled set of parameter configurations for applying to the card indicating when and how the card is used, the bundled set of parameter configurations comprising a combination of a subset of the plurality of predetermined card parameter configurations in response to determining that the combination of the subset of the plurality of predetermined card parameter configurations has a highest combined score value of the plurality of card usage scores generated utilizing the machine-learning model;

provide, for display at a client device, the bundled set of parameter configurations as a recommendation for the card management program in connection with providing the card to one or more users;

determining measured card usage data comprising a measured acquisition rate and a measured retention rate for the card management program based on the bundled set of parameter configurations being applied to the card management program;

determining a loss based on the measured card usage data and a card usage score generated by the machine-learning model for the combination of the subset of the plurality of predetermined card parameter configurations by:

determining, from the card usage score generated by the machine-learning model and the measured card usage data, a first difference between an estimated acquisition rate and the measured acquisition rate and a second difference between an estimated retention rate and the measured retention rate; and utilizing a loss function to determine the loss utilizing the first difference and the second difference; and modifying the trained weights of the machine-learning model according to the loss to reduce the first difference between the estimated acquisition rate and the measured acquisition rate and the second difference between the estimated retention rate and the measured retention rate.

11. The system of claim 10, further comprising instructions that, when executed by the at least one processor, cause the system to:

determine the plurality of predetermined card parameter configurations by:

determining a first plurality of predetermined card parameter configurations for a first card parameter category;

determining a second plurality of predetermined card parameter configurations for a second card parameter category different than the first card parameter category; and generate the plurality of card usage scores by generating, utilizing the machine-learning model, a card usage score for a combination of a first card parameter configuration of the first plurality of predetermined card parameter configurations and a second card parameter configuration of the second plurality of predetermined card parameter configurations.

12. The system of claim 10, further comprising instructions that, when executed by the at least one processor, cause the system to generate the plurality of card usage scores by:

generating a card acquisition score indicating an estimated acquisition rate associated with a combination of predetermined card parameter configurations from the plurality of predetermined card parameter configurations; or generating a card retention score indicating an estimated retention rate associated with the combination of predetermined card parameter configurations from the plurality of predetermined card parameter configurations.

13. The system of claim 10, further comprising instructions that, when executed by the at least one processor, cause the system to generate the bundled set of parameter configurations by:

comparing a first card usage score for a first combination of predetermined card parameter configurations to a plurality of additional card usage scores for a plurality of additional combinations of predetermined card parameter configurations; and generating the bundled set of parameter configurations from the first combination of predetermined card parameter configurations in response to the first card usage score being higher than the plurality of additional card usage scores.

14. The system of claim 10, further comprising instructions that, when executed by the at least one processor, cause the system to:

generate, for display at the client device, one or more graphical user interface elements corresponding to one or more predetermined card parameter configurations of the plurality of predetermined card parameter configurations; and modify the bundled set of parameter configurations in response to one or more user interactions with the one or more graphical user interface elements.

15. The system of claim 10, further comprising instructions that, when executed by the at least one processor, cause the system to:

receive a request to modify the card management program by replacing a selected card parameter configuration of the bundled set of parameter configurations with an additional predetermined card parameter configuration of the plurality of predetermined card parameter configurations;

generate a copy of the bundled set of parameter configurations;

replace, within the copy of the bundled set of parameter configurations, the selected card parameter configuration with the additional predetermined card parameter configuration of the plurality of predetermined card parameter configurations; and provide, for display at the client device, the copy of the bundled set of parameter configurations comprising the additional predetermined card parameter configuration.

16. The system of claim 10, further comprising instructions that, when executed by the at least one processor, cause the system to:

selecting, utilizing the machine-learning model comprising the trained weights in connection with a plurality of different user segments, the bundled set of parameter configurations for a first user segment according to learned features indicating user attributes of the first user segment; and selecting, utilizing the machine-learning model, an additional bundled set of parameter configurations comprising an additional combination of an additional subset of the plurality of predetermined card parameter configurations for a second user segment according to additional learned features indicating user attributes of the second user segment.

17. A non-transitory computer readable storage medium comprising instructions that, when executed by at least one processor, cause the at least one processor to:

determine, in response to a request to generate a card management program comprising software and data that controls when and how one or more cards are used to engage in payment transactions, combinations of a plurality of predetermined card parameter configurations corresponding to a plurality of different card parameter categories, wherein the plurality of predetermined card parameter configurations indicates usage characteristics of the one or more cards in relation to using the one or more cards to engage in payment transactions;

generate, utilizing a machine-learning model comprising trained weights based on a historical card dataset including card usage data for a plurality of card management programs, a plurality of card usage scores for the combinations of the plurality of predetermined card parameter configurations from the plurality of predetermined card parameter configurations by encoding features of the combinations of the plurality of predetermined card parameter configurations according to the trained weights, wherein a card usage score of the plurality of card usage scores represents, for a combination of predetermine card parameter configurations, a combined score value based on:

an estimated card acquisition rate defining a rate at which users presented with an option to obtain a card sign up for a card; and an estimated card retention rate defining a rate at which users keep an account for the card for a specific amount of time;

generate a bundled set of parameter configurations for applying to the card indicating when and how the card is used, the bundled set of parameter configurations comprising a combination of a subset of the plurality of predetermined card parameter configurations in response to determining that the combination of the subset of the plurality of predetermined card parameter configurations has a highest combined score value of the plurality of card usage scores generated utilizing the machine-learning model;

provide, for display at a client device, the bundled set of parameter configurations as a recommendation for the card management program in connection with providing the card to one or more users;

determining measured card usage data comprising a measured acquisition rate and a measured retention rate for the card management program based on the bundled set of parameter configurations being applied to the card management program;

determining a loss based on the measured card usage data and a card usage score generated by the machine-learning model for the combination of the subset of the plurality of predetermined card parameter configurations by:

determining, from the card usage score generated by the machine-learning model and the measured card usage data, a first difference between an estimated acquisition rate and the measured acquisition rate and a second difference between an estimated retention rate and the measured retention rate; and utilizing a loss function to determine the loss utilizing the first difference and the second difference; and modifying the trained weights of the machine-learning model according to the loss to reduce the first difference between the estimated acquisition rate and the measured acquisition rate and the second difference between the estimated retention rate and the measured retention rate.

18. The non-transitory computer readable storage medium of claim 17, further comprising instructions that, when executed by the at least one processor, cause the at least one processor to:

determine the plurality of predetermined card parameter configurations by determining a first plurality of predetermined card parameter configurations for a first card parameter category and a second plurality of predetermined card parameter configurations for a second card parameter category different than the first card parameter category; and generate the plurality of card usage scores by generating, utilizing the machine-learning model, a card usage score for a combination of a first card parameter configuration of the first plurality of predetermined card parameter configurations and a second card parameter configuration of the second plurality of predetermined card parameter configurations.

19. The non-transitory computer readable storage medium of claim 17, further comprising instructions that, when executed by the at least one processor, cause the at least one processor to generate the bundled set of parameter configurations by:

comparing the plurality of card usage scores for the combinations of the plurality of predetermined card parameter configurations; and generating the bundled set of parameter configurations from a combination of predetermined card parameter configurations having a highest card usage score.

20. The non-transitory computer readable storage medium of claim 17, further comprising instructions that, when executed by the at least one processor, cause the at least one processor to:

generate, in response to a request to modify the card management program, a copy of the bundled set of parameter configurations; and replace, within the copy of the bundled set of parameter configurations, a selected card parameter configuration with an additional predetermined card parameter configuration of the plurality of predetermined card parameter configurations.

\* \* \* \* \*